(12) United States Patent
Jo et al.

(10) Patent No.: US 12,355,316 B2
(45) Date of Patent: Jul. 8, 2025

(54) AXLE DRIVING APPARATUS WITH ELECTRIC MOTOR FOR WORK VEHICLE

(71) Applicant: KANZAKI KOKYUKOKI MFG. CO., LTD., Amagasaki (JP)

(72) Inventors: Kentaku Jo, Amagasaki (JP); Shunichi Okamoto, Amagasaki (JP)

(73) Assignee: KANZAKI KOKYUKOKI MFG. CO., LTD., Amagasaki (JP)

( * ) Notice: Subject to any disclaimer, the term of this patent is extended or adjusted under 35 U.S.C. 154(b) by 0 days.

(21) Appl. No.: 18/619,310

(22) Filed: Mar. 28, 2024

(65) Prior Publication Data

US 2024/0333110 A1 Oct. 3, 2024

(30) Foreign Application Priority Data

Mar. 31, 2023 (JP) ................ 2023-059316

(51) Int. Cl.
*H02K 11/33* (2016.01)
*B60K 1/00* (2006.01)
*B60L 15/00* (2006.01)
*F16H 57/02* (2012.01)
*F16H 57/037* (2012.01)
*H02K 7/116* (2006.01)

(52) U.S. Cl.
CPC ............ *H02K 11/33* (2016.01); *B60L 15/007* (2013.01); *F16H 57/037* (2013.01); *H02K 7/116* (2013.01); *B60K 2001/001* (2013.01); *F16H 2057/02034* (2013.01); *F16H 2057/02052* (2013.01); *H02K 2213/09* (2013.01); *H02K 2213/12* (2013.01)

(58) Field of Classification Search
CPC .... B60K 1/00; B60K 2001/001; H02K 7/006; H02K 7/116; H02K 2213/09; H02K 2213/12; B60L 15/007; B60L 15/2036; F16H 57/037; F16H 2057/02034; F16H 2057/02052
See application file for complete search history.

(56) References Cited

U.S. PATENT DOCUMENTS

| | | | |
|---|---|---|---|
| 8,899,381 B2 | 12/2014 | Ebihara et al. | |
| 11,701,957 B1* | 7/2023 | Janson | F16H 37/041 |
| | | | 475/149 |
| 11,824,422 B2* | 11/2023 | Jang | H02K 7/006 |
| 11,904,672 B2* | 2/2024 | Yamashita | B60K 17/12 |
| 2024/0278636 A1* | 8/2024 | Yokoyama | F16H 57/0424 |

* cited by examiner

*Primary Examiner* — James J Taylor, II
(74) *Attorney, Agent, or Firm* — CANTOR COLBURN LLP

(57) ABSTRACT

An axle driving apparatus with an electric motor is used in a work vehicle that travels by driving right and left wheels with a common electric motor. An axle case for accommodating an input shaft, a gear mechanism, a first axle, and a second axle has an input shaft support. An inverter case is mounted on an end surface of the motor case that is fixed to the input shaft support. The inverter case has a base end mounted on the end surface of the motor case and a terminal end which is on the opposite side with respect to the base end. The terminal end protrudes radially outwardly from the outer circumferential surface of the motor case in a direction not facing the first and second axles.

3 Claims, 19 Drawing Sheets

AXLE DRIVING APPARATUS WITH ELECTRIC MOTOR FOR WORK VEHICLE

CROSS REFERENCE TO RELATED APPLICATIONS

The present invention claims priority under 35 U.S.C. § 119 to Japanese Application, 2023-059316, filed on Mar. 31, 2023, the entire contents of which being incorporated herein by reference.

TECHNICAL FIELD

The present disclosure relates to an axle driving apparatus with an electric motor used for a work vehicle.

BACKGROUND ART

It is conventionally known in the field involving a work vehicle such as a riding lawn mower including a mower device to enable the work vehicle to travel by driving wheels with an electric motor. Patent Document 1 discloses the riding lawn mower in which by driving right and left wheels with a right electric motor and a left electric motor, respectively, the right and left wheels can be driven separately from each other.

PRIOR ART DOCUMENT

Patent Document

Patent Document 1: U.S. Pat. No. 8,899,381

SUMMARY OF INVENTION

Technical Problem

In the above mentioned work vehicle in which the left and right wheels are driven separately by the two electric motors, two axle driving apparatuses with electric motors, each of which includes the axle to which the wheel can be attached, are mounted on a vehicle frame in parallel along a width direction of the work vehicle. In such the axle driving apparatus, an input shaft to which power of the electric motor is input, a gear mechanism, and an axle are accommodated in an axle case, and the electric motor is fixed to the axle case. The work vehicle secures a space for mounting the axle driving apparatus with an electric motor.

In order to drive the electric motor, the work vehicle mounts a battery, a controller, and an inverter on appropriate positions in a vehicle frame. The battery and the controller, the controller and the inverter, and the inverter and the electric motor are electrically connected using a number of harnesses therebetween. In such a system that the left and right wheels are driven separately by respective electric motors, the number of harnesses connecting the inverter and the electric motor is further increased.

In order to reduce the number of harnesses to be used, it may be considered to integrate the inverter with the axle driving apparatus with an electric motor. The inverter is a device that converts a direct current supplied from a battery into an alternating current having a plurality of phases to supply power to the electric motor and uses a number of electronic components and a large circuit board, so that an inverter case requires a considerable volume.

On the other hand, since components and the like related to the work machine are present around a space for mounting the axle driving apparatus on both sides of the work vehicle, there is no room to expand the space for mounting the axle driving apparatus. As a result, the inverter case integrated with the axle driving apparatus may interfere with other components.

An object of the present disclosure is to provide a compact inverter-integrated axle driving apparatus with an electric motor that can be easily mounted on the work vehicle without interfering with other components, even in the work vehicle having a limited space for mounting the axle driving apparatus.

Solution to Problem

According to the present disclosure, an axle driving apparatus with an electric motor mounted on a work vehicle that travels by driving right and left wheels with a common electric motor, includes an axle case for accommodating an input shaft to receive power from the electric motor, first and second axles substantially parallel to the input shaft, a differential gear to differentially connect the first and second axles, and a gear mechanism to operationally connect the input shaft and the differential gear, the axle case including an input shaft support for supporting the input shaft and an axle support for supporting the first and second axles; a motor case of the electric motor that is provided on one side of the input shaft support; and an inverter for controlling the electric motor to supply power, the inverter including an inverter case to accommodate a circuit board of the inverter, wherein the inverter case has a base end attached on an end surface of the motor case and a terminal end that is formed on an opposite side with respect to the base end, and the terminal end protrudes radially outwardly from an outer circumferential surface of the motor case in a direction not facing the first and second axles.

Advantageous Effects of Invention

According to the axle driving apparatus with an electric motor of the present disclosure, it is possible to reduce the thickness of the inverter while keeping a volume necessary for the circuit board. This allows the inverter case to be prevented from interfering with other components mounted on the vehicle side in the thickness direction of the inverter case installed in the vehicle, while keeping the areas necessary for the circuit boards of the inverter, when the axle driving apparatus is mounted on the vehicle.

In the above mentioned axle driving apparatus with an electric motor for a work vehicle, the motor case has a plurality of screw holes formed at a plurality of positions on a first virtual circle in the end surface, the inverter case has a plurality of screw insertion holes formed at a plurality of positions on a second virtual circle that is the same as the first virtual circle in size, the inverter case is fixed to the motor case by screw connection using the plurality of screw insertion holes and the plurality of screw holes, and the inverter case may be configured to be attached to the motor case so as to be able to select one of a plurality of attachment postures around a center point of the first and second virtual circles.

According to the above mentioned configuration, this makes it easy to change the orientation of the inverter to an appropriate position where the inverter does not interfere with the other components according to, for example, a status of the arrangement of the other components in the space where the axle driving apparatus is mounted on the vehicle.

In the above mentioned axle driving apparatus with an electric motor for a work vehicle, the plurality of screw holes are formed at equal intervals on the first virtual circle in the end surface of the motor case, and the plurality of screw insertion holes may be configured to be formed at equal intervals on the second virtual circle of the inverter case.

In the above-mentioned axle driving apparatus with an electric motor for a work vehicle, the inverter case may be configured to be attached to the motor case so that a posture of the inverter case is changeable between the plurality of attachment postures which differ in orientation by 90 degree.

DESCRIPTION OF EMBODIMENTS

Figure 1:
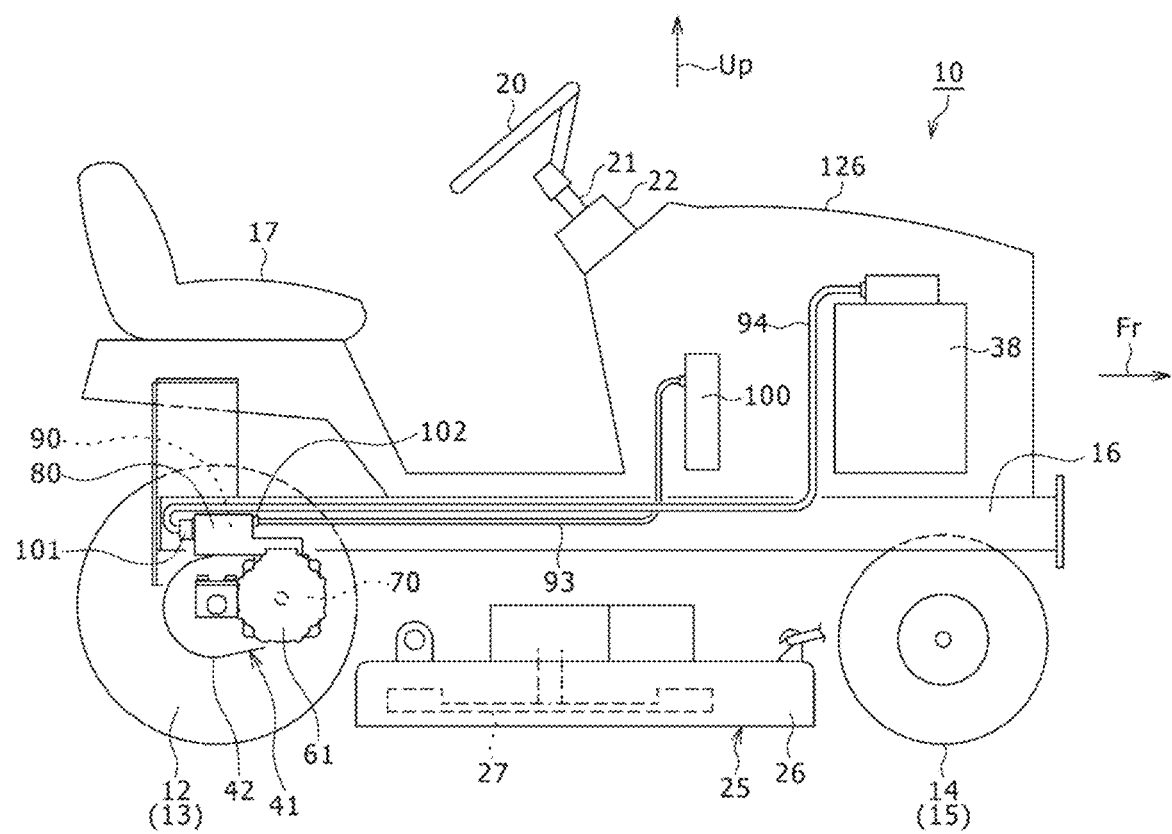
FIG. 1 is a side view, partially shown as cross sectional view, of a vehicle mounting an axle driving apparatus with an electric motor for a work vehicle according to an embodiment of the present disclosure.

Now some embodiments of the present disclosure will be described below in detail with reference to the drawings. Hereinafter, an example in which an axle driving apparatus with an electric motor for a work vehicle is a work vehicle and is mounted on the work vehicle will be described. However, the vehicle on which the axle driving apparatus with an electric motor for a work vehicle is mounted is not limited thereto, and may be another work vehicle having a work machine which performs one or more of snow removal work, excavation work, civil engineering work, and agricultural work.

Alternatively, the vehicle may be an off-road type Utility Vehicle which has a cargo bed and travels on an uneven ground, an All Terrain Vehicle (ATV) called a buggy, a Recreational Vehicle (RV), or a Recreational Off-highway Vehicle (ROV).

In the following, although an example in which two rear wheels of the vehicle are driven with a common electric motor is described, it may be configured that two front wheels of the vehicle are driven with a common electric motor.

In the following description, the similar components in all the drawings are denoted by the same reference numerals.

First Embodiment

FIG. 1 to FIG. 9 show the first embodiment. In the drawings referred below, the front side, the left side and the upper side with respect to the vehicle are indicated by Fr, Lh, and Up, respectively.

First, an overall configuration of the work vehicle 10 as an example on which the axle driving apparatus with an electric motor for a work vehicle according to the present embodiment is mounted is described, and then the axle driving apparatus 41 mounted on the work vehicle 10 is described in detail. FIG. 1 is a side view, partially shown as cross sectional view, of the work vehicle 10 mounting the axle driving apparatus 41.

The engineless passenger-type work vehicle 10 includes a main frame 16 forming a vehicle body, rear wheels 12, 13 which are two primary driving wheels supported on the rear side of the main frame 16, and front wheels 14, 15 which are two steered wheels supported on the front side of the main frame. The axle driving apparatus 41 having one electric motor 70 is connected to the right and left rear wheels 12, 13.

Figure 4:
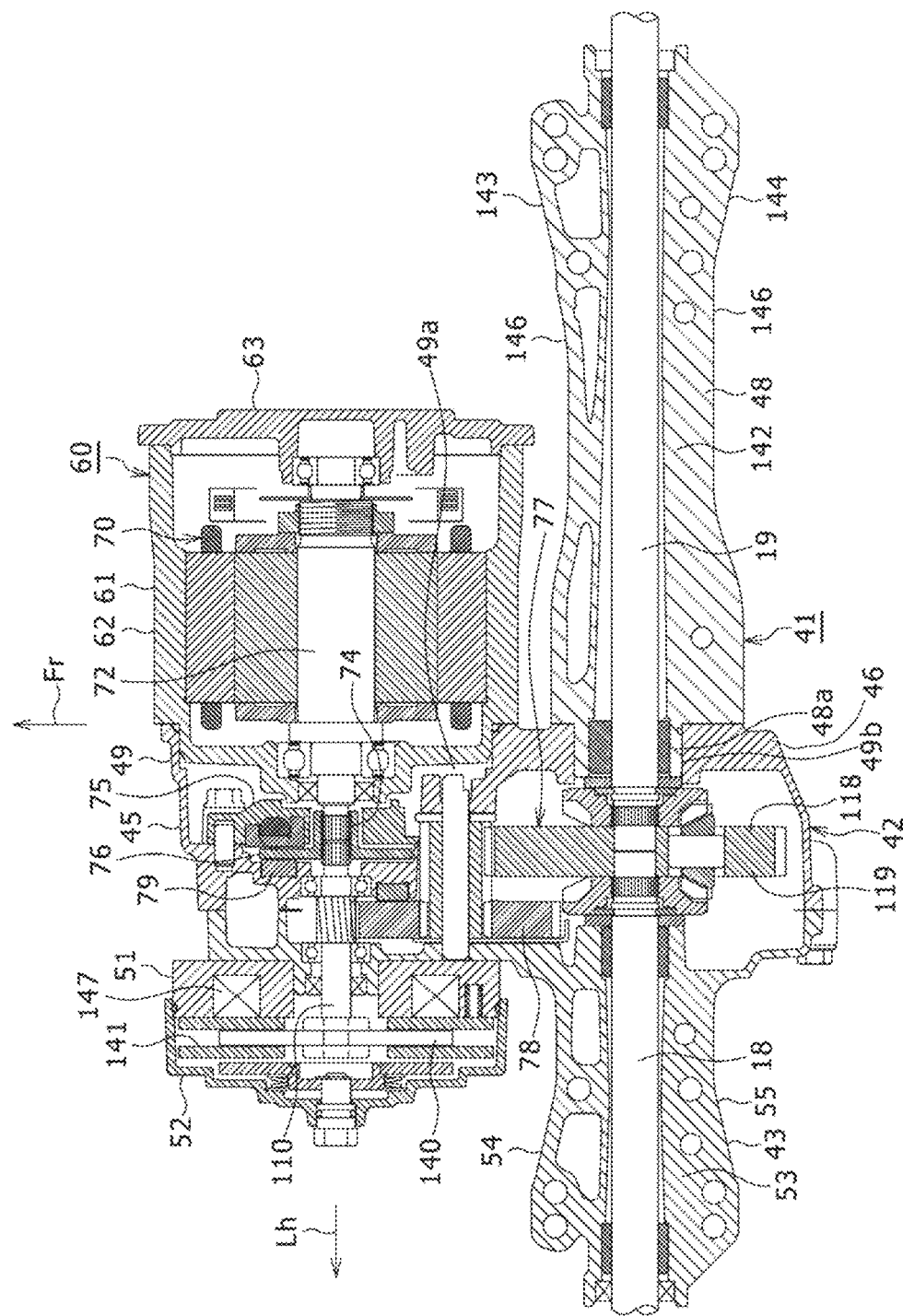
FIG. 4 is a horizontally cross-sectional view of the axle driving apparatus with an electric motor for a work vehicle of FIG. 2.

As described later, the axle driving apparatus 41 includes an axle case 42, an electric motor 70 accommodated in a motor case 61 fixed to the axle case 42, an inverter 90 accommodated in an inverter case 80 fixed to the motor case 61, and a gear mechanism 77 (see FIG. 4) accommodated in the axle case 42 and transmitting power of the electric motor 70 to the left and right rear wheels 12, 13. As shown in FIG. 4 referred later, the gear mechanism 77 includes a reduction gear mechanism 78 and a differential gear 118, and power output from the differential gear 118 drives the left and right rear wheels 12, 13 via the first and second axles 18, 19.

In the main frame 16, an operator's seat 17 is provided on the upper side in a middle section in the front-back direction, and a steering wheel 20 which is a turning instruction unit and an accelerator pedal (not shown) are provided in front of the operator's seat 17. By operating the steering wheel 20, the front wheels 14, 15 are steered via a steering linkage (not shown) disposed on the front side of the work vehicle 10. The steering mechanism may use an Ackermann system or the like. The axle driving apparatus 41 is suspended at a rear lower portion of the main frame 16 in the front-rear direction.

The accelerator pedal corresponds to an acceleration instruction unit which instructs the acceleration of the electric motor 70. The accelerator pedal is disposed on the floor of the operator's seat 17. The accelerator pedal is, for example, of a seesaw type. When an operator steps on the front end of the accelerator pedal with his/her toe, the electric motor 70 rotates in an advancing direction and accelerates. When the operator steps on the rear end of the accelerator pedal with his/her heel, the electric motor 70 rotates in a reversing direction and accelerates. A pedal sensor detects a swing direction and amount of the accelerator pedal and transmits a detected signal to a controller 100. The controller 100 controls a rotating direction and velocity of the electric motor 70 in response to the signal detected by the pedal sensor.

Furthermore, the work vehicle 10 includes a mower device 25 which is a work machine, and a power unit 38 having a battery. The mower device 25 is suspended from and supported by the main frame 16 between the front wheels 14, 15 and the rear wheels 12, 13. The mower device 25 includes a mower deck 26 and a mowing blade 27 which is a rotary tool for mowing that is rotatable around a vertical axis inside the mower deck 26. The mowing blade 27 is driven by an electric motor for the mower (not shown) and mows the lawn inside the mower deck 26.

The power unit 38 is accommodated in a bonnet 126 on the upper side of the main frame 16 and on the front side of the operator's seat 17. The steering wheel 20 is fixed to an upper end of a steering shaft 21. The steering shaft 21 is rotatably supported by a steering column 22 fixed to the rear side of the bonnet 126.

Furthermore, the main frame 16 of the work vehicle 10 supports a brake pedal (not shown) on which the operator can step by his/her foot on the floor of the operator's seat 17. Furthermore, the work vehicle 10 is provided with a parking brake switch (not shown) which can be manually manipulated by the operator near the operator's seat 17. When the brake pedal is manipulated, a first brake device 79 (see FIG. 4), which is described later, operates to brake the rear wheels 12, 13. When the parking brake switch is manipulated, a second brake device 141, which is described later, operates to keep the rotation of the rear wheels 12, 13 stopped.

Figure 2:
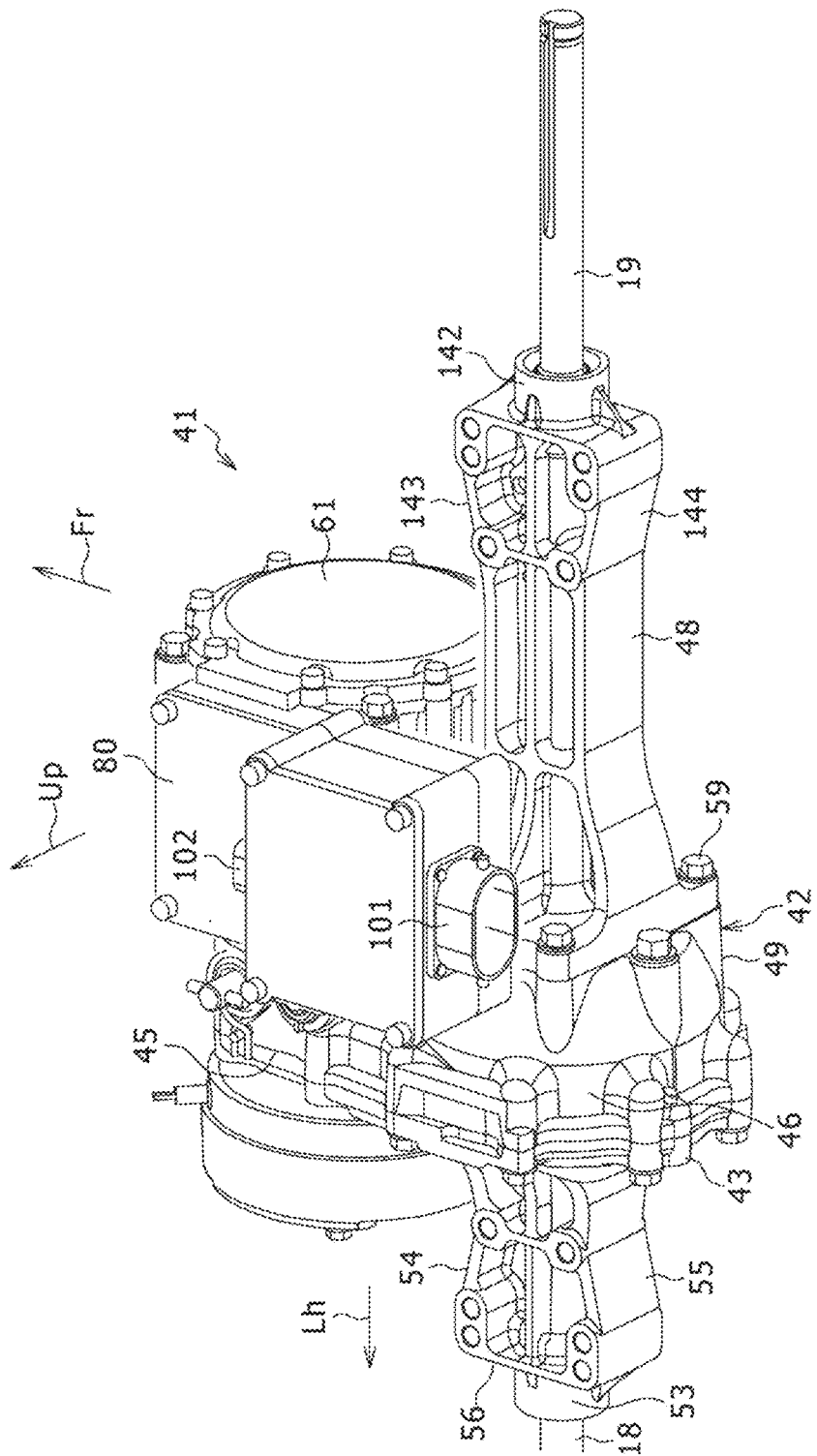
FIG. 2 is a perspective view illustrating the axle driving apparatus with an electric motor for a work vehicle shown in FIG. 1.
Figure 3:
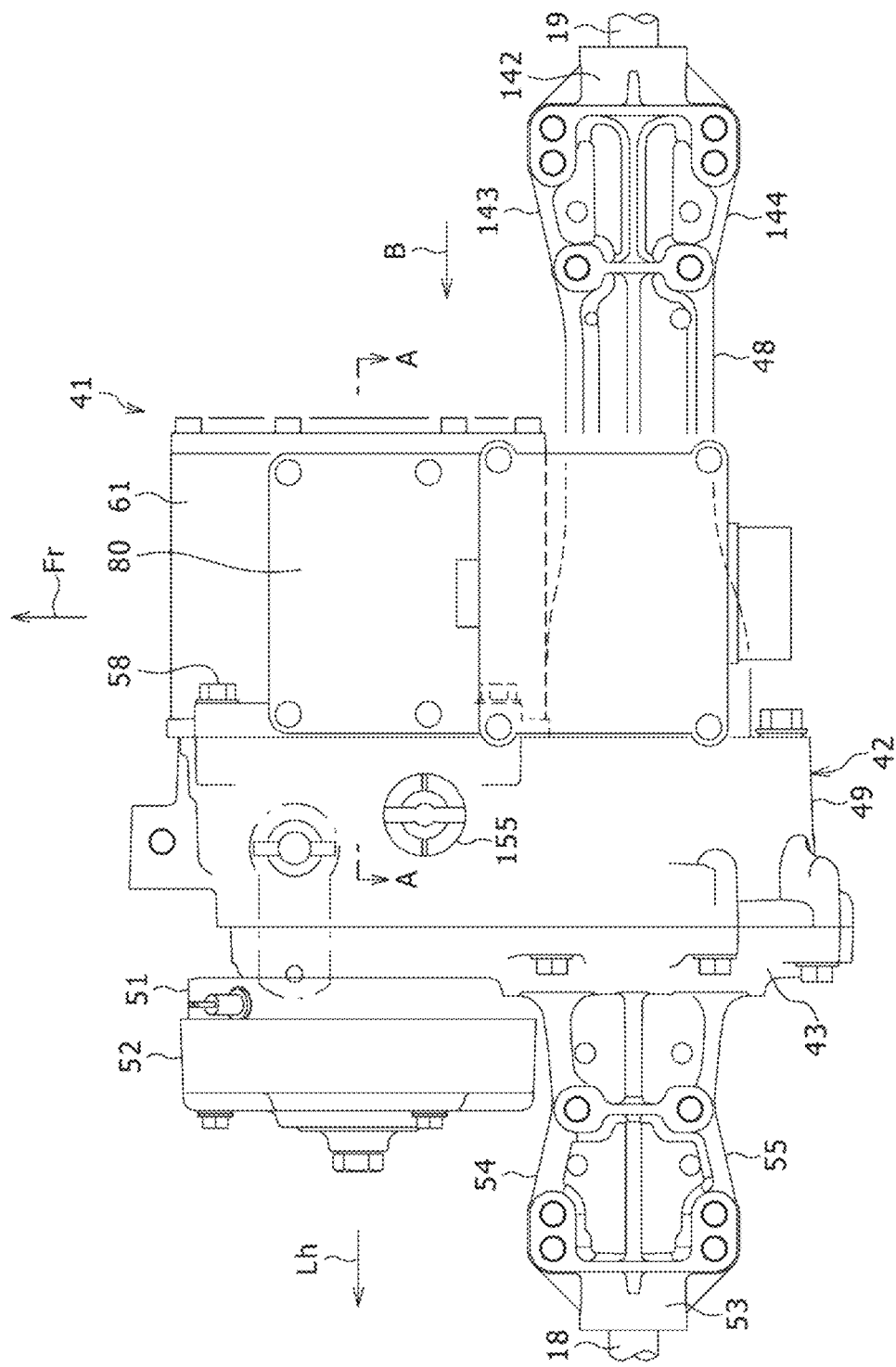
FIG. 3 is a plan view of the axle driving apparatus with an electric motor for a work vehicle of FIG. 2.
Figure 5:
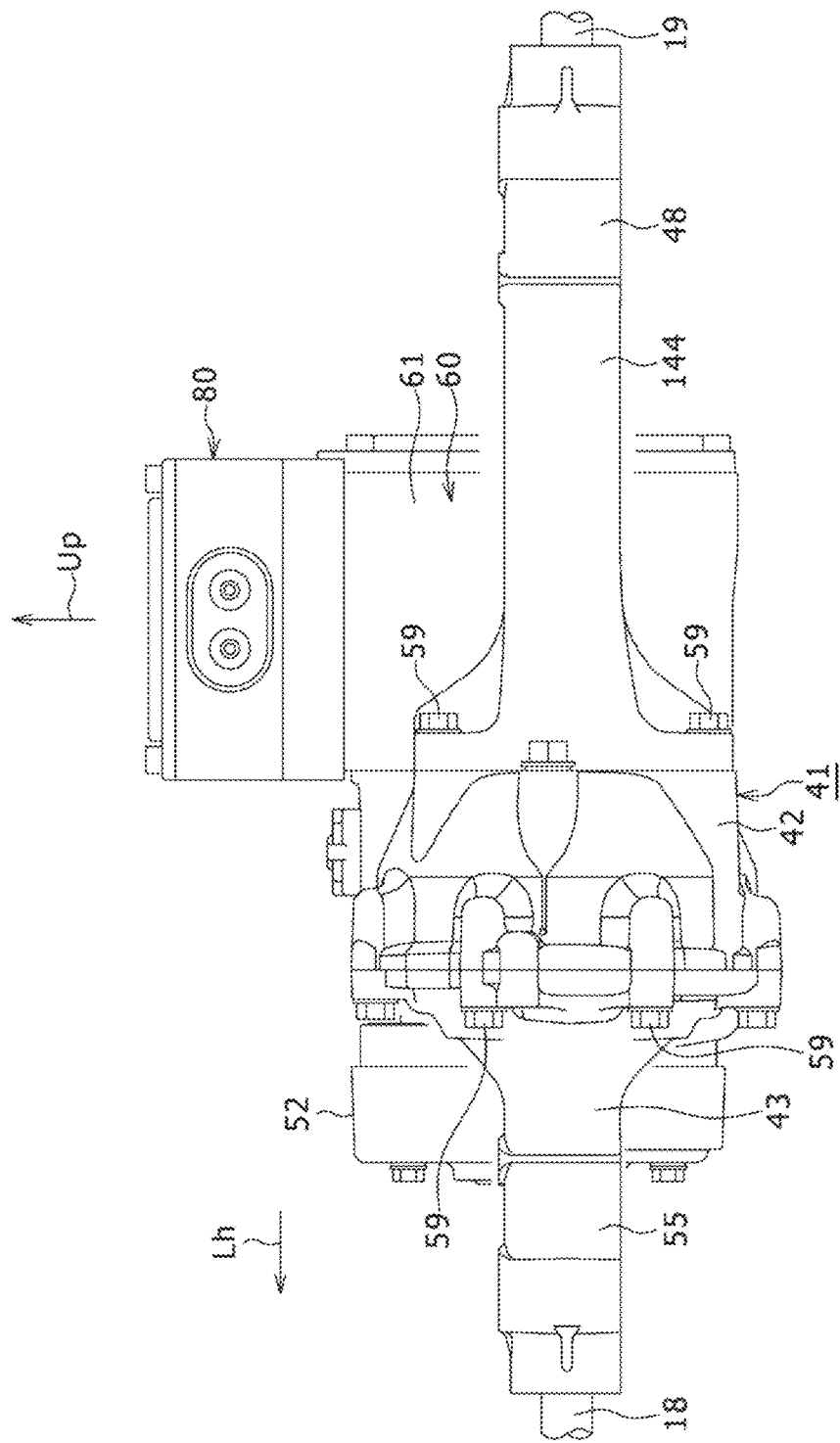
FIG. 5 is a rear view of the axle driving apparatus with an electric motor for a work vehicle of FIG. 2.

This is the overall configuration of the work vehicle 10. Next the axle driving apparatus 41 mounted on the work vehicle 10 is described. FIG. 2 is a perspective view illustrating the axle driving apparatus 41 from FIG. 1. FIG. 3 is a plan view of the axle driving apparatus 41. FIG. 4 is a horizontally cross-sectional view of the axle driving apparatus 41. FIG. 5 is a rear view of the axle driving apparatus 41.

The axle driving apparatus 41 includes an axle case 42 and a motor case 61 constituting a motor inverter device 60 fixed to the axle case 42. The axle case 42 supports the first and second axles 18, 19 and accommodates therein power transmission components which transmit power from the motor inverter device 60 to the first and second axles 18, 19. The motor inverter device 60 includes the motor case 61, an electric motor 70 for traveling accommodated in the motor case 61, an inverter case 80 fixed to the motor case 61, and an inverter 90 accommodated in the inverter case 80. The motor case 61 and the inverter case 80 are integrally combined and fixed to the axle case 42.

The axle case 42 has an input shaft support 45 on the front side which is one side of the front-rear direction and an axle support 46 on the rear side which is the other side of the front-rear direction, and accommodates an input shaft 110, the gear mechanism 77, and the first and second axles 18, 19, which serve as the power transmission components, as shown in FIG. 4. The gear mechanism 77 includes a reduction gear mechanism 78 and a differential gear 118. The reduction gear mechanism 78 is a gear mechanism which transmits power between the input shaft 110 and a ring gear 119 provided on an outer circumferential side of the differential gear 118, and reduces a rotating speed to transmit the power from the input shaft 110 to the ring gear 119. The differential gear 118 differentially transmits the power transmitted to the ring gear 119 to the first and second axles 18, 19.

The input shaft 110, which is rotatably supported at the input shaft support 45 of the axle case 42, is coaxially aligned with a motor shaft 72 of the electric motor 70 and is connected to the motor shaft 72 via a connecting member 74 so as not to rotate relatively with respect to the motor shaft 72, i.e., so as to rotate integrally with the motor shaft 72.

A single-plate like first brake rotor 76 is integrally provided on the outer circumferential surface of the connecting member 74. This allows the first brake rotor 76 to be prevented from relatively rotating with respect to the input shaft 110 and the motor shaft 72.

A brake pad and a brake shoe are disposed so as to sandwich the first brake rotor 76. When the operator sitting on the operator's seat 17 manipulates the brake pedal, the brake shoe is forced to be pressed against the first brake rotor 76 by the action of a cam mechanism (not shown). This allows the rear wheels 12, 13 connected to the first brake rotor 76 to be braked. The vehicle speed can be adjusted by changing the step-on force of the brake pedal. By linking the electric motor 70 to operate as a generator in the work vehicle 10, when the operator manipulates the brake pedal, the vehicle can be braked by both the regenerative braking force and the braking force of the first brake device 79.

A first axle case 43 for accommodating the first axle 18, a second axle case 48 for accommodating the second axle 19, and an intermediate case 49 are separably connected to each other by a plurality of bolts through a joint surface perpendicular to the axles 18, 19, so that they are integrated as the axle case 42.

An opening 49a is provided on the right side surface of the input shaft support 45 formed on the front side of the intermediate case 49. The intermediate case 49 is separably connected to the motor case 61 by a plurality of bolts 58 with an outer end surface of the motor case 61 being brought into contact with the opening. This allows the left side end of the motor case 61 which is one side end thereof to be fixed to the input shaft support 45 of the axle case 42.

An opening for protruding the input shaft 110 outward is provided on the left side surface of the input shaft support 45 formed on the front side of the first axle case 43, and an annular holder 51 is fixed to a peripheral portion of the opening so as to close the opening. A stepped bottomed cylindrical brake cover 52 is fixed to a left side end of the holder 51. A second brake rotor 140 fixed to a left side end of the input shaft 110 is accommodated in a portion surrounded by the holder 51 and the brake cover 52.

The second brake rotor 140 constitutes a second brake device for parking 141 which is an electromagnetic brake. Brake pads face each other on axially both side surfaces of the second brake rotor 140. When the operator sitting on the operator's seat 17 turns on the parking brake switch, pressing force by a spring is applied to both sides of the second brake rotor 140 from the brake pads so as to sandwich the second brake rotor 140, thereby braking the first and second axles 18, 19.

An electromagnetic solenoid 147 held by a holder 51 is disposed so as to face the outer surface of one of the brake pads. When the parking brake switch is turned off, power is supplied to the electromagnetic solenoid 147. Since the electromagnetic solenoid 147 separates one of the brake pads from the second brake rotor 140 by the electromagnetic force overcoming the spring force, the second brake rotor 140 is not braked.

The first and second axles 18, 19 disposed in the axle support 46 formed on the rear side of the intermediate case 49 are arranged such that the inner ends thereof abut on each other. A center hole of the ring gear 119 constituting the differential gear 118 is relatively rotatably fitted into the abutting portion to support the ring gear 119.

A small-diameter cylindrical portion 48a provided at a left side end of a tapered cylindrical portion 142 of the second axle case 48 is fitted into inside of an attaching opening 49b on the right side surface of the axle support 46.

An end surface of the second axle case 48 is abutted to a peripheral portion of the attaching opening 49b on the right side surface of the intermediate case 49, and the intermediate case 49 and the second axle case 48 are connected to each other by a plurality of bolts 59 (see FIG. 3 and FIG. 5).

The cylindrical portion 142 includes reinforcing ribs 143, 144 which are formed on both sides in the front-rear direction of the outside and along an axial direction of the cylindrical portion 142. The second axle 19 is rotatably supported by bearings on the inner and outer end sides of the cylindrical portion 142 of the second axle case 48.

Furthermore, as shown in FIG. 3, an air breather device 155 is provided at a position located above the gear chamber in the upper surface of the axle case 42. The air breather device 155 is provided in order to prevent liquids such as water, dust, etc. from entering into the axle case 42 from the upper side and in order to allow air inside the gear chamber to be sucked in and out of the axle case 42 when lubricating oil in the gear chamber expands.

Figure 6:
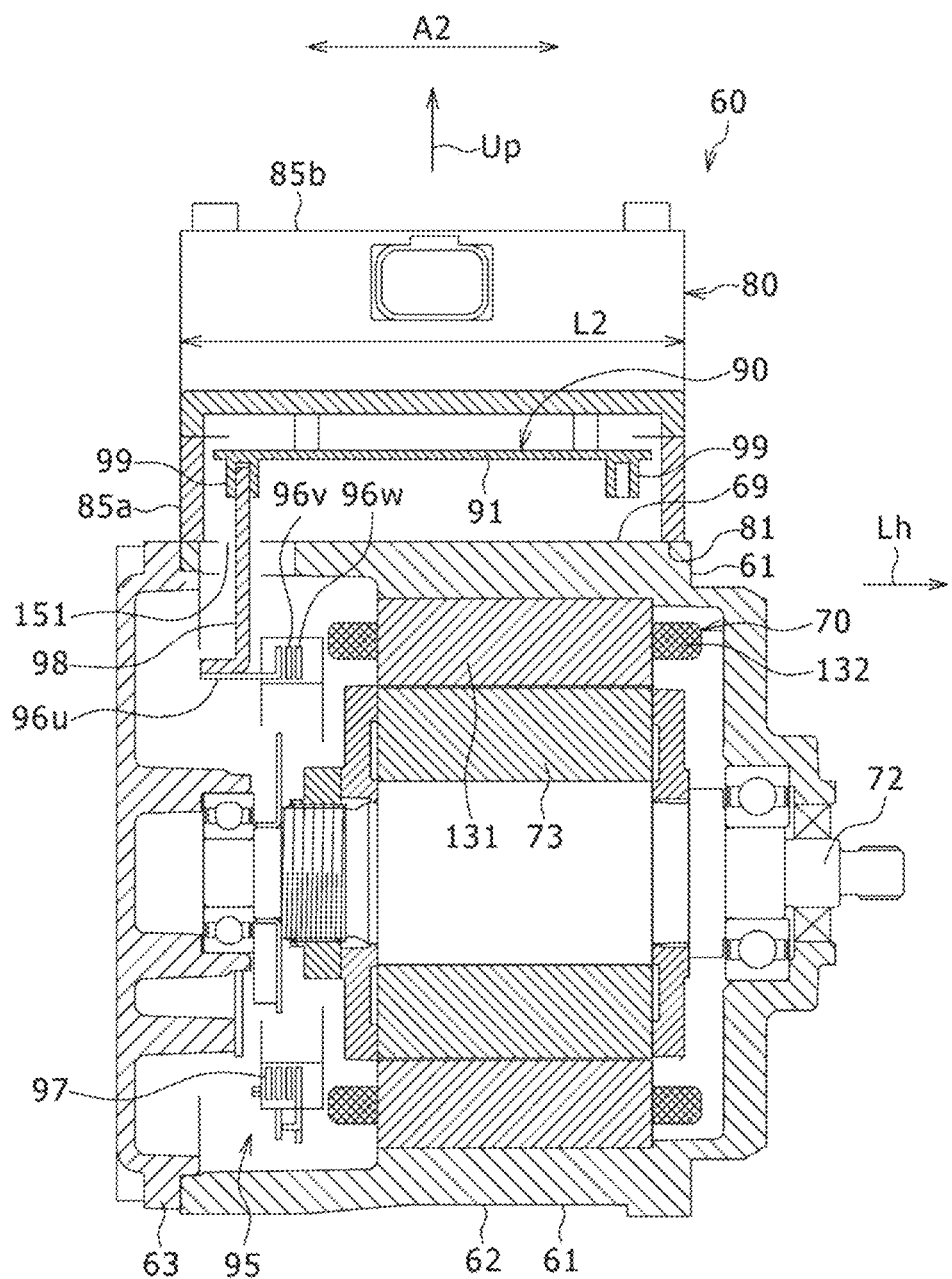
FIG. 6 is a cross sectional view taken along line A-A of a motor inverter device shown in FIG. 3.
Figure 7:
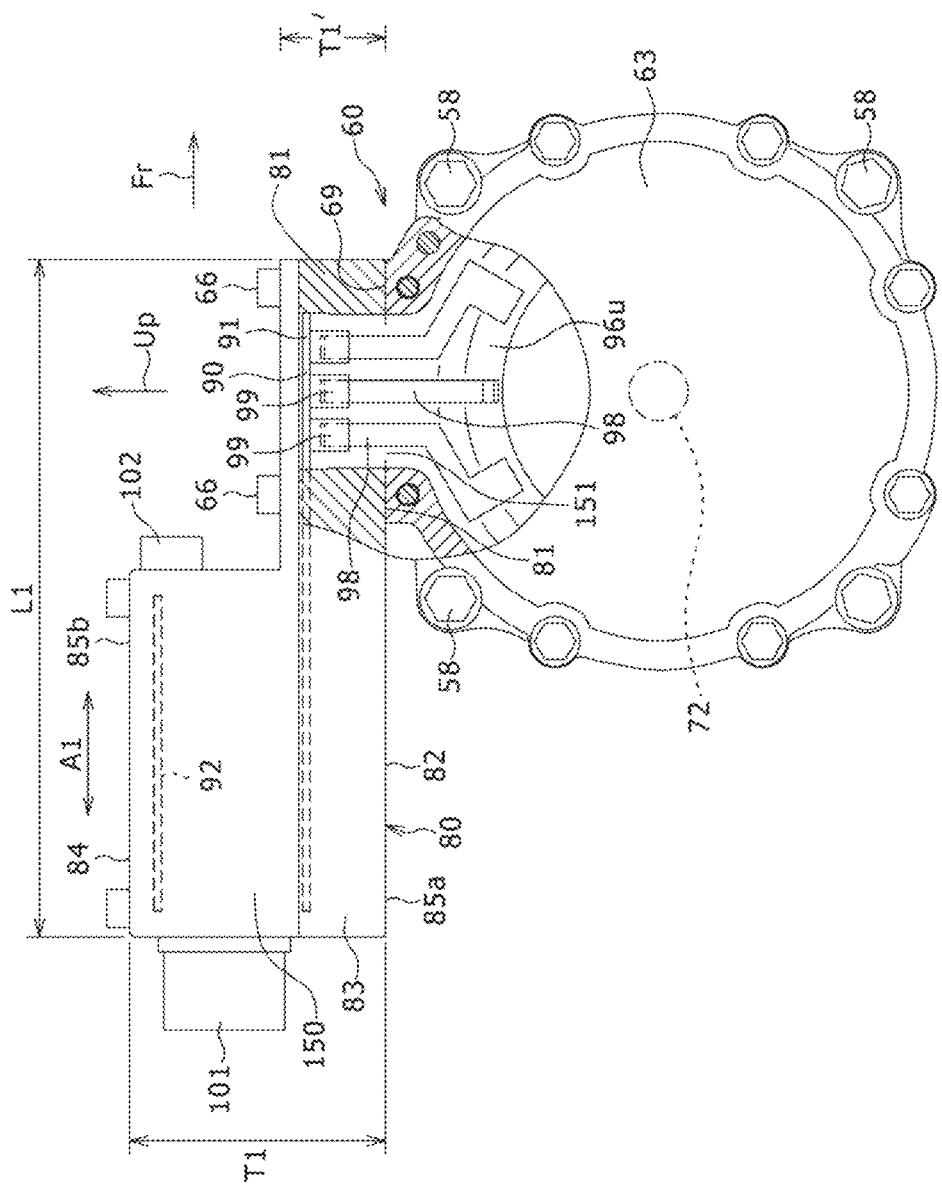
FIG. 7 is a view, partially shown as cross sectional view, of the motor inverter device shown in FIG. 3 viewed from an arrow B's direction.
Figure 8:
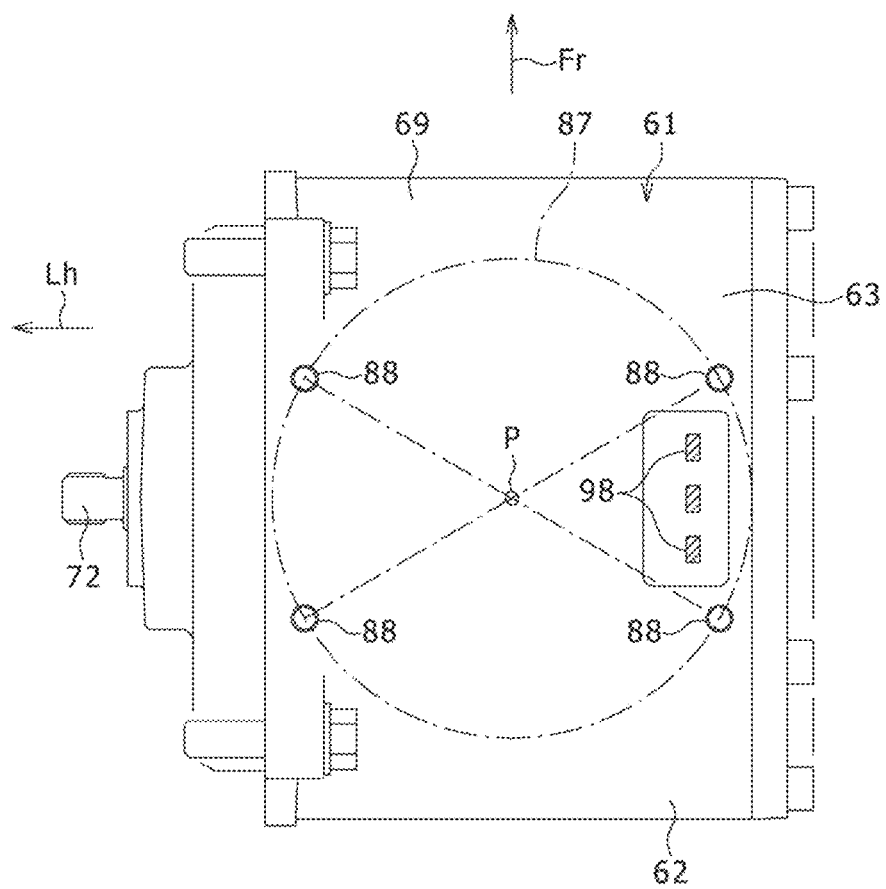
FIG. 8 is a plan view of an electric motor shown in FIG. 3.
Figure 9:
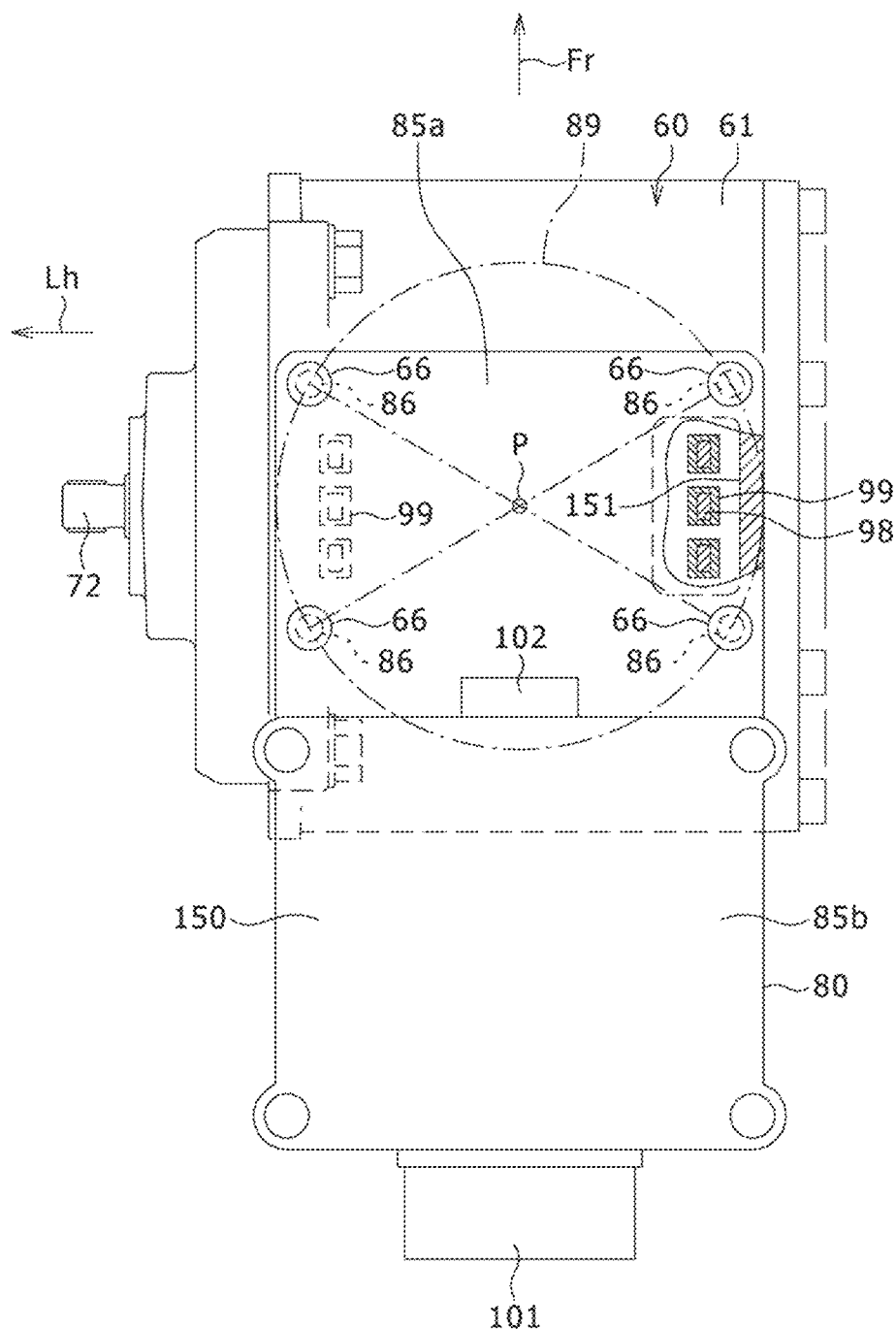
FIG. 9 is a plan view of the motor inverter device shown in FIG. 3.

Next, in the motor inverter device 60 an arrangement of the motor case 61 in which the electric motor 70 is accommodated and the inverter case 80 in which the inverter 90 is accommodated is described. FIG. 6 is a cross sectional view taken along line A-A of a motor inverter device 60 shown in FIG. 3. FIG. 7 is a view, partially shown as cross sectional view, of the motor inverter device 60 shown in FIG. 3 viewed from an arrow B's direction, FIG. 8 is a plan view of the motor case 61 shown in FIG. 3. FIG. 9 is a plan view of the motor inverter device 60 shown in FIG. 3.

As described above, the left side end of the motor case 61, which is one side end of the motor case 61, is fixed to the input shaft support 45 of the axle case 42. The motor case 61 includes a bottomed cylindrical main body 62 in which the electric motor 70 is accommodated, and a motor cover 63 connected by bolts to the main body 62 so as to close an opening at the right side end of the main body 62, which is the other side end of the main body 62.

Furthermore, an inverter case 80 is fixed to the outer circumferential surface of the motor case 61. Specifically, in the present embodiment, an inverter fixing portion 69 (see FIG. 6 and FIG. 7) is provided on an upper end surface of an outer wall of the outer circumferential surface of the main body 62. A base end 81 provided on the other side in a longitudinal direction of a bottom surface of the inverter case 80, which will be described later, can abut on the inverter fixing portion 69. For example, the inverter fixing portions 69 are formed by flat surfaces provided on tip end surfaces of block like protrusions protruding radially outwardly (upwardly) from upper ends of the outer circumferential surface of the motor case 61. The flat surface is perpendicular to the protruding direction of the protrusion and aligned with a horizontal direction.

The electric motor 70 is a three-phase permanent magnet motor, for example. As shown in FIG. 6, the electric motor 70 includes a motor rotor 73 fixed to an outer circumferential surface of the motor shaft 72, a stator core 131 facing an outer circumferential surface of the motor rotor 73, and a three-phase stator coil 132 disposed on and wound around the stator core 131. The motor rotor 73 has permanent magnets arranged at a plurality of positions along a circumference of the rotor core, for example. The stator core 131 is fixed to the inner surface of the motor case 61. The motor shaft 72 is rotatably disposed inside the motor case 61. Power converted into three-phase alternating current is supplied to the stator coil 132 from a battery of the power unit 38 via the inverter 90 described later, whereby the motor shaft 72 can rotate.

The inverter 90, which converts a direct current supplied from a battery into the three phase alternating current and supplies power to the electric motor 70, is disposed inside the inverter case 80. As shown in FIG. 6 and FIG. 7, the inverter 90 includes a first circuit board 91 and a second circuit board 92 which is located above the first circuit board 91 and is smaller than the first circuit board 91 in area. In FIG. 7, illustration of the detailed structures of each circuit boards 91, 92 is omitted. A part of wiring of the first circuit board 91 is connected to that of the second circuit board 92. This allows the inverter 90 to have, for example, an inverter circuit including three arms each of which has two switching elements electrically connected in series, and an inverter controller which controls the inverter circuit.

The operation of the inverter 90 is controlled by a controller 100. The controller 100 is disposed inside the bonnet 126. The controller 100 is connected to the inverter 90 via a signal cable 93. The controller 100 can control switching operations of the switching elements of the inverter 90 via the signal cable 93. A direct current is supplied to the inverter 90 from a battery of the power unit 38 via a power cable 94. The controller 100 controls switching operations of the switching elements of the inverter 90 via the inverter controller 100, whereby the inverter 90 can convert the direct current into the three phase alternating current and supply the power to the electric motor 70. This allows the electric motor 70 to be controlled by the controller 100 via the inverter 90.

As shown in FIG. 7, the inverter case 80 has a base end 81 mounted on the outer circumferential surface of the motor case 61, and a terminal end 150 which is on opposite side with respect to the base end 81. The thickness T1 on the terminal end 150 side is set so as to be larger than the thickness T1' on the base end 81 side.

The thickness T1 is smaller than a length L1 (see FIG. 6) in a first direction (i.e., a front-rear direction indicated by a double-headed arrow A1 shown in FIG. 7) which is perpendicular to the thickness direction, so that it has a flat shape. In the inverter case 80, the lengths L1 and L2 in the first direction and the second direction (i.e., the left-right direction indicated by a double-headed arrow A2 in FIG. 6) which are perpendicular to each other and to the thickness direction are larger than the thickness T1. Furthermore, in the inverter case 80, the length L1 in the first direction is larger than the length L2 in the second direction. Therefore, the inverter case 80 has a flat shape elongated in the first direction perpendicular to the thickness direction. Here, the "thickness" refers to a dimension in a direction perpendicular to a plate-surface first direction (longitudinal direction) and a plate-surface second direction (traverse direction) in the first and second circuit boards 91, 92.

The inverter case 80 includes a first plate portion 82 provided at a lower end, a peripheral wall portion 83 extending outwardly in a vehicle width direction from an outer circumferential edge of the first plate portion 82, and a stepped second plate portion 84 closing an opening at an upper end of the peripheral wall portion 83, and is a substantially L-shaped box as viewed from a side, as shown in FIG. 7. Specifically, in the inverter case 80, the second portion 85b, which is an upper rectangular parallelepiped box portion, is stacked on and connected to one side of a first portion 85a, which is a lower rectangular parallelepiped box portion, in the longitudinal direction along the first direction A1. The first circuit board 91 is disposed in the first portion 85a, and the second circuit board 92 is disposed in the second portion 85b. As shown in FIG. 9, the inverter case 80 is, for example, screwed to the motor case 61 by bolts 66 which penetrate ends of the first plate portion 82 on the motor case 61 side and ends of the other side in the longitudinal direction of the second plate portion 84 which is on the opposite side with respect to the motor case 61. The first portion 85a and the second portion 85b communicate with each other through an internal space which encloses wirings for interconnecting the first circuit board 91 and the second circuit board 92.

In order to mount the inverter 90 on the electric motor 70, specifically four bolt insertion holes 86, which pass through the inverter case 80 in the thickness direction, are formed at four corners of a rectangular portion viewed from a thickness direction, which is not overlapped with the second portion 85b in the thickness direction and is exposed to the outside, of the first portion 85a of the inverter case 80. Each of the bolt insertion holes 86 has a circular cross section, and the bolt 66 for fixing the inverter case 80 to the motor case 61 is inserted into the bolt insertion hole 86. The bolt insertion holes 86 are each aligned with screw holes 88 of the motor case 61 described later.

The inverter case 80 has the base end 81 mounted on the outer circumferential surface of the motor case 61, and the terminal end 150 which is on the opposite side with respect to the base end 81. The terminal end 150 extends toward the rear side which is one side in the longitudinal direction which is the first direction away from the motor case 61. If seeing the motor case 61 from the axial direction, the inverter case 80 protrudes radially outwardly from the outer circumferential surface of the motor case 61. In the present example, the first direction of the inverter case 80 is along the vehicle front-rear direction, and the second direction is along the left-right direction. Furthermore, the terminal end 150 of the inverter case 80 is disposed on the rear side of the motor case 61. As shown in FIG. 3, this allows the terminal end 150 of inverter case 80 to be arranged to overlap with the upper side of the second axle case 48 of the axle case 42, when seeing the axle driving apparatus 41 from above.

As shown in FIG. 8, an outer surface of the inverter fixing portion 69 of the motor case 61 has a plurality of screw holes 88 formed at four positions, which are a plurality of positions on a first virtual circle 87 indicated by a one-dot chain line, whose center is a substantially middle point P in the axial direction of the motor shaft 72. Specifically, the four screw holes 88 can be grouped into a pair of two screw holes on the front and rear sides. Furthermore, the four screw holes 88 are formed at positions symmetrical with respect to the front-rear direction vertical plane passing through the center point P and at positions symmetrical with respect to the right-left direction vertical plane passing through the center point P. Two screw holes 88 on the left side and the two screw holes 88 on the right side are formed at the same positions in the left-right direction. Each of the screw holes 88 is the same in size.

As shown in FIG. 9, the four bolt insertion holes 86 of the inverter case 80 are formed at four positions which are a plurality of positions on a second virtual circle 89 which is the same as the first virtual circle 87 in size. The two bolt insertion holes 86 on the front side of the four bolt insertion holes 86 are aligned with the two screw holes 88 (see FIG. 8) on the front side of the motor case 61. The two bolt insertion holes 86 on the rear side of the four bolt insertion holes 86 are aligned with the two screw holes 88 on the rear side of the motor case 61. Each of the bolt insertion holes 86 is the same in size. The inverter case 80 is fixed to the motor case 61 by screwing to the four screw holes 88 the four bolts 66 which penetrate the four bolt insertion holes 86 from the outside of the inverter case 80 toward the motor case 61. In FIG. 9, a head portion of the bolt 66 is shown as a circle in a simplified manner.

According to the configuration of the present example, the inverter case 80 extends toward one side in the longitudinal direction away from the motor case 61, and the terminal end 150 protrudes outward in the radial direction from the outer circumferential surface of the motor case 61. This allows the inverter case 80 to be thin while keeping the areas necessary for the circuit boards 91, 92 of the inverter circuit, so that the inverter case 80 can be prevented from interfering with other components mounted on the vehicle side in the thickness direction of the inverter case 80 installed in the vehicle. Furthermore, since the terminal end 150 of the inverter case 80 is disposed on the rear side of the motor case 61, it is possible to prevent or suppress the inverter case 80 from protruding forward or rearward in the front-rear direction from both end positions of the axle case 42 in the front-rear direction. This allows an increase in the length of the axle driving apparatus 41 in the front-rear direction to be suppressed.

Figure 11:
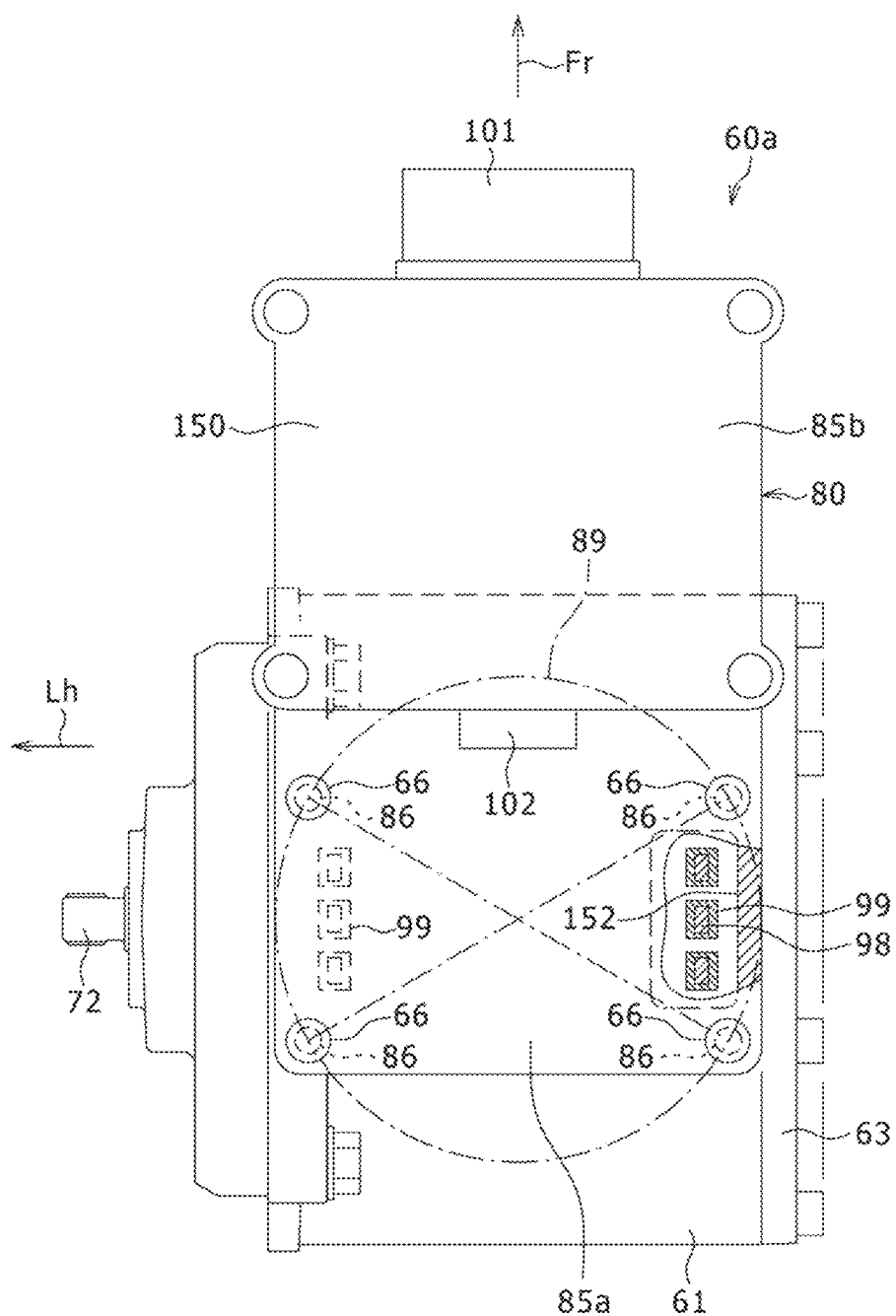
FIG. 11 is a plan view of the motor inverter device shown in FIG. 10.

Furthermore, in the present example, as shown in FIG. 11 referred later, the inverter case 80 can be fixed to the motor case 61 by screwing such that a positional relationship between the inverter case 80 and the motor case 61 in the front-rear direction is reversed compared to the example shown in FIG. 9. That is, the inverter case 80 can be configured to be attached to the motor case 61 so that their attachment postures are changeable therebetween. This allows the orientation of inverter case 80 to be easily changed to an appropriate orientation according to an arrangement situation or the like of other components in the various types of work vehicles, which are located near the space where the axle driving apparatus 41 is mounted on, so as not to interfere with the other components.

As shown in FIG. 6 and FIG. 7, a bus bar unit 95 including four bus bars each of which is an annular plate-shaped conductive member is provided at an end on the motor cover 63 side in the inner space of the motor case 61. In the bus bar unit 95, three-phase bus bars 96u, 96v, and 96w of U-phase, V-phase, and W-phase and a neutral point bus bar 97 are arranged side by side substantially coaxially along the axial direction. The three-phase bus bars 96u, 96v, and 96w are connected to three-phase stator coils 132 of U-phase, V-phase, and W-phase of the electric motor 70, respectively. The neutral point bus bar 37 is electrically connected to the three-phase bus bars 96*u*, 96*v*, and 96*w*. Four bus bars 96*u*, 96*v*, 96*w*, and 97 are arranged to be separated from each other via an insulating member such as an insulating resin and are unitized.

One end of each of three lead plates 98 of U-phase, V-phase, and W-phase is connected to different positions in a direction along the circumference of each of the three-phase bus bars 96*u*, 96*v*, and 96*w* which constitute the bus bar unit 95. Each of the lead plates 98 is led to radially outwardly from the motor case 61. The other end of each of lead plates 98 is guided into the first portion 85*a* of the inverter case 80 through a radial passage in the inverter fixing portion 69 with the intermediate portion of each of the lead plates 98 being bent. In this state, the other end of each of the lead plates 98 is connected to each of connection terminals 99 (see FIG. 6 and FIG. 7) which are provided on the first circuit board 91 in the first portion 85*a* to correspond to the respective phases.

In order to enable the lead plates 98 connected to the bus bars to be connected to the connection terminals 99 inside the inverter case 80, an opening 151 (see FIG. 7 and FIG. 9), which encloses portions overlapping with the lower ends of the three connection terminals 99 in the up-down direction and penetrates the first plate portion 82 in the up-down direction, is formed in the bottom surface of the first plate portion 82 of the inverter case 80.

As shown in FIG. 6 and FIG. 9, the connection terminals 99 are arranged side by side in the front-rear direction to protrude downward at the right side end on the lower surface of the first circuit board 91. On the other hand, the connection terminals 99 are also arranged side by side in the front-rear direction to protrude downward at the left side end of the lower surface of the first circuit board 91. As shown in FIG. 11 referred later, when replacing the position of the inverter case 80 and the position of the motor case 61 with each other in the front-rear direction and attaching them reversely, the connection terminals 99 at the left end are respectively connected to the other ends of the lead plates 98 of the three phases with the connection terminals 99 being aligned with the other ends of the three-phase lead plates 98 connected to the bus bar unit 95. At this time, similarly to the opening 151 for the connection terminal at the right end, an opening 152 (see FIG. 11), which encloses portions overlapping with the lower ends of the connection terminals 99 in the up-down direction and penetrates the first plate portion 82 in the up-down direction, may be formed in the bottom surface of the first plate portion 82 of the inverter case 80.

A first connector 101 is attached to an end surface of one side end in the longitudinal direction of the second portion 85*b* of the inverter case 80 so as to protrude outward, and a second connector 102 is attached to an end surface of the other side end in the longitudinal direction of the second portion 85*b* of the inverter case 80 so as to protrude outward. The power unit 38 supplies power to the inverter 90 via the first connector 101 and the power cable 94 connected to the first connector 101. On the other hand, the inverter 90 can transmit and receive signals to and from the controller 100 via the second connector 102 and the signal cable 93 connected to the second connector 102.

In the present example, in a state where the inverter case 80 is mounted on the vehicle, the first direction which is the longitudinal direction of the inverter case 80 is along the front-rear direction of the vehicle, so that the maximum height between the upper and lower ends of the inverter case 80 can be reduced. This allows the inverter case 80 to be more effectively prevented from interfering with other components existing in the mounting space on the vehicle side.

In the foregoing, the example, in which the inverter case 80 is fixed to the motor case 61 by screwing the four bolts 66 inserted into the four bolt insertion holes 86 of the inverter case 80 to the four screw holes 88 of the motor case 61, is described. However, the present disclosure is not limited to this configuration, and as long as the bolt insertion holes 86 are positioned on the first virtual circle and the screw holes 88 are positioned on the second virtual circle, the number of the bolt insertion holes 86, the screw holes 88, and the bolts 66 may be any integer of two or more.

Second Embodiment

Figure 10:
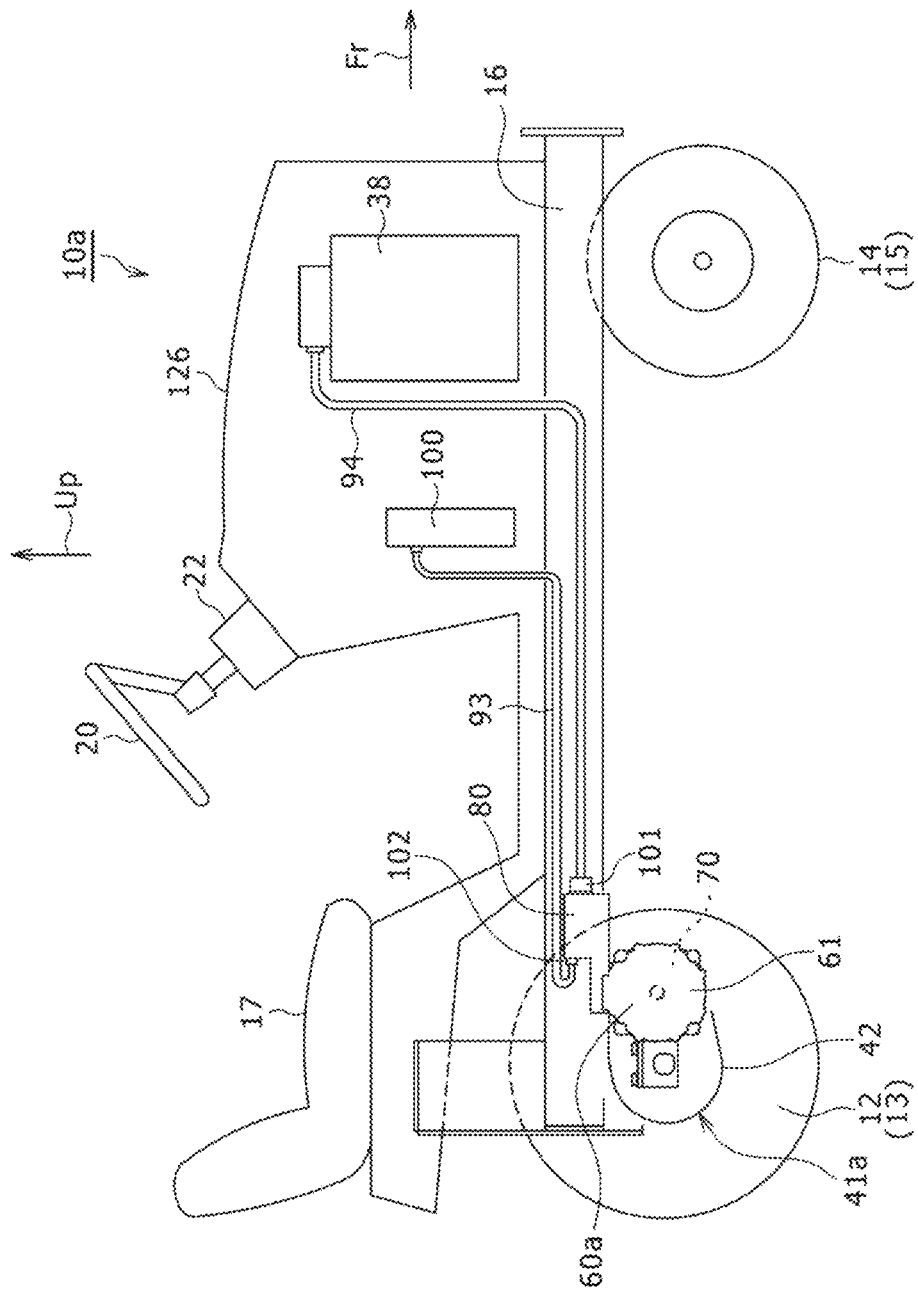
FIG. 10 is a side view, partially shown as cross sectional view, of a vehicle mounting an axle driving apparatus with an electric motor for a work vehicle according to an alternative example of the embodiment.

FIG. 10 and FIG. 11 show a second embodiment which is an alternative example of the embodiment. FIG. 10 is a side view, partially shown as cross sectional view, of a work vehicle 10*a* mounting the axle driving apparatus according to the second embodiment. FIG. 11 is a plan view of the motor inverter device 60*a* shown in FIG. 10. In FIG. 10, illustration of the mower device is omitted.

In the motor inverter device 60*a* according to the alternative example shown in FIG. 10 and FIG. 11, the inverter case 80 is fixed to the motor case 61 such that the positional relationship between the inverter case 80 and the motor case 61 in the front-rear direction is reversed compared to the example shown in FIG. 1 and FIG. 9. In the present example, similarly to the configuration of FIG. 1 to FIG. 9, the motor case 61 has the screw holes 88 (see FIG. 8) formed at four positions on the first virtual circle 87 (see FIG. 8) on the outer surface, and the inverter case 80 has the bolt insertion holes 86 formed at four positions on the second virtual circle 89 which is the same as the first virtual circle 87 in size.

Furthermore, the four screw holes 88 are formed on the outer surface of the inverter fixing portion 69 (see FIG. 8) so that the four screw holes 88 are grouped into a pair of two screw holes on the front and rear sides and the pair of the two screw holes are arranged at the same positions in the front-rear direction, and the four screw holes 88 are also grouped into a pair of two screw holes on the right and left sides in the right-left direction. The pair of two screw holes 88 on the left and right side are formed at the same positions in the left-right direction.

On the other hand, in axle driving apparatus 41*a* of the present example, the inverter case 80 extends toward the front side which is one side in the longitudinal direction away from the motor case 61, and the terminal end 150 is positioned in front of the motor case 61. At this time, compared to the configuration shown in FIG. 1 to FIG. 9, the inverter case 80 can be fixed to the motor case 61 without changing the basic shape of the outside appearance of the inverter case 80 by changing the positional relationship between the inverter case 80 and the motor case 61 in the front-rear direction.

Furthermore, the other ends of the three lead plates 98 of the U-phase, V-phase, and W-phase are derived radially outwardly from the motor case 61, and are led into the first portion 85*a* of the inverter case 80 via a radial passage in the inverter fixing portion 69 (see FIG. 7). In this state, the other end of each of the lead plates 98 is guided into the first portion 85*a* through an opening 152 provided in the first plate portion 82 (see FIG. 7) of the inverter case 80. The other end of each of the lead plates 98 is connected to the connection terminal 99 (see FIG. 11) of a corresponding phase provided on the first circuit board 91 (see FIG. 7).

At this time, only one opening of the inverter case 80, through which the other end of each of the lead plates 98 passes, may be formed in the first plate portion 82 of the inverter case 80, or such the openings may be formed one each on the left and right sides. In addition, only one set of the connection terminals 99 for three phases may be provided, or such the sets of the connection terminals 99 may be provided one set each on the left and right sides.

In the present example, unlike the configuration shown in FIG. 1 to FIG. 9, the terminal end 150 of the inverter case 80 is disposed forwardly of the motor case 61, so that the axle driving apparatus 41*a* may be greater in length in the front-rear direction than the configuration shown in FIG. 1 to FIG. 9. On the other hand, since the positions of the first connector 101 and the second connector 102 are easily arranged forward, it may be possible to reduce the length in the front-rear direction from each of the connectors 101, 102 to the power unit 38 or the controller 100 on the front side. This allows the length of the power cable 94 connecting the first connector 101 and the power unit 38 and the length of the signal cable 93 connecting the second connector 102 and the controller 100 to be easily reduced. In the present example, the other configurations and functions are similar to those shown in FIG. 1 to 9.

Third Embodiment

Figure 12:
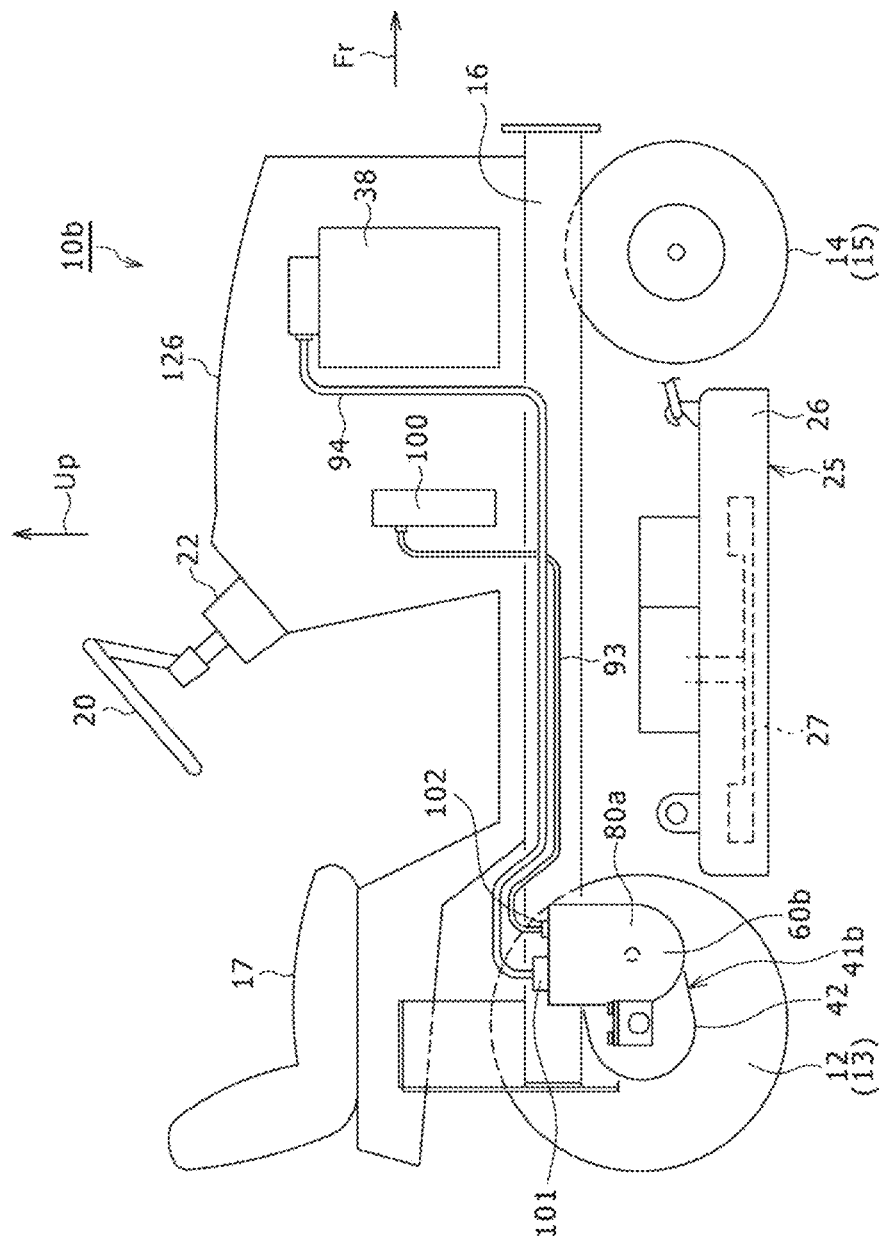
FIG. 12 is a side view, partially shown as cross sectional view, of a vehicle mounting an axle driving apparatus with an electric motor for a work vehicle according to further alternative example of the embodiment.
Figure 13:
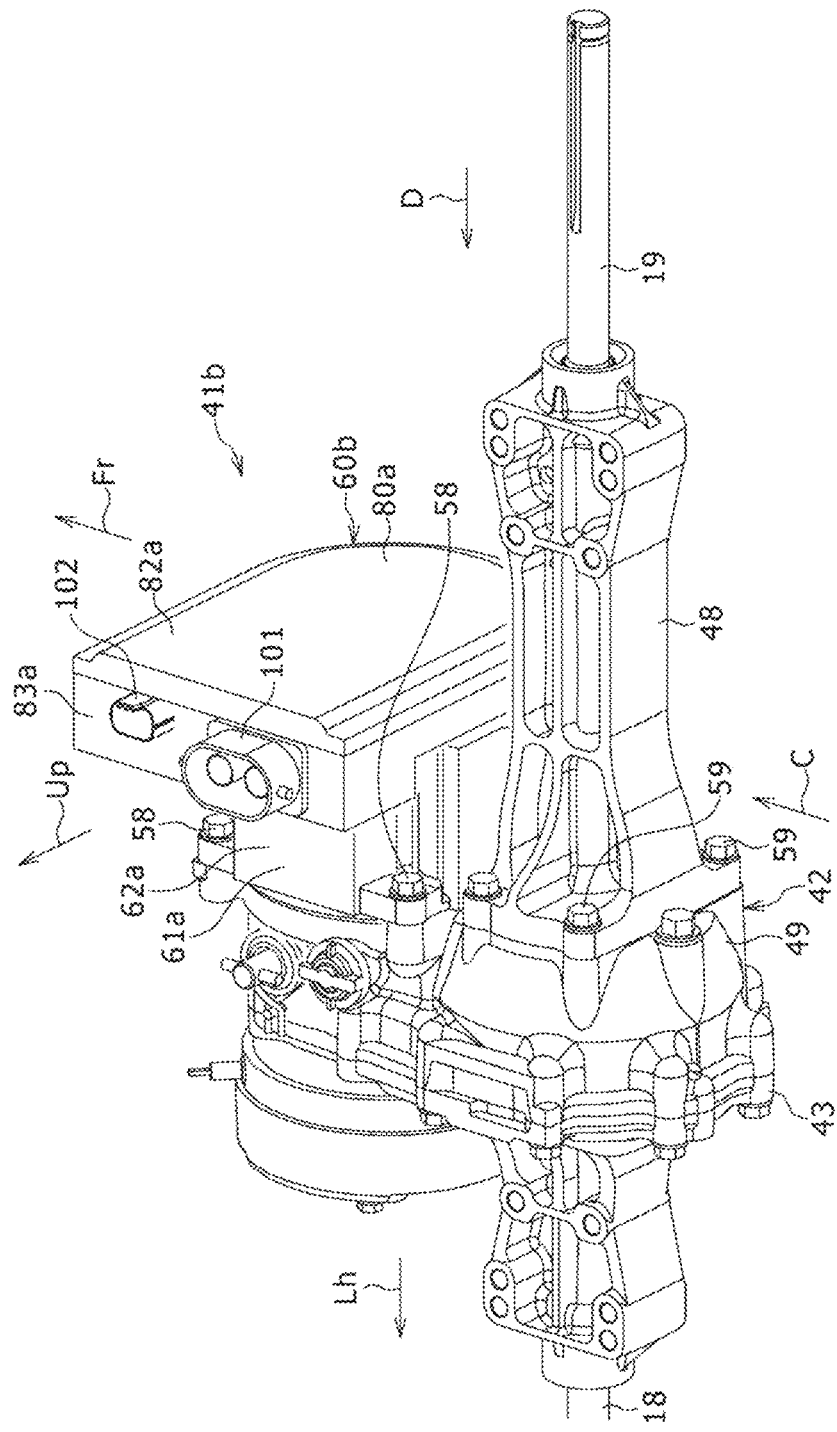
FIG. 13 is a perspective view illustrating the axle driving apparatus with an electric motor for a work vehicle shown in FIG. 12.
Figure 14:
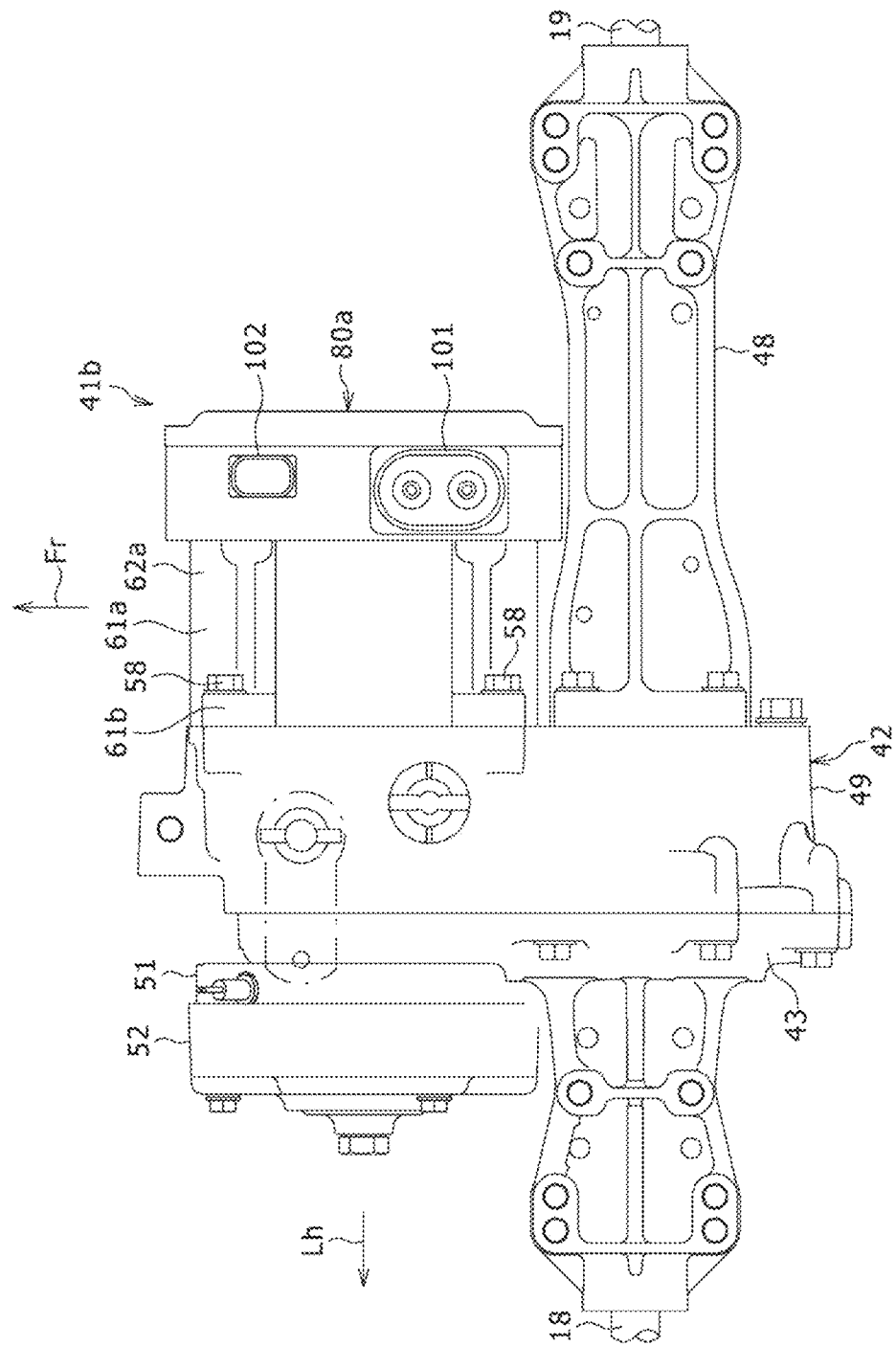
FIG. 14 is a plan view of the axle driving apparatus with an electric motor for a work vehicle of FIG. 13.
Figure 15:
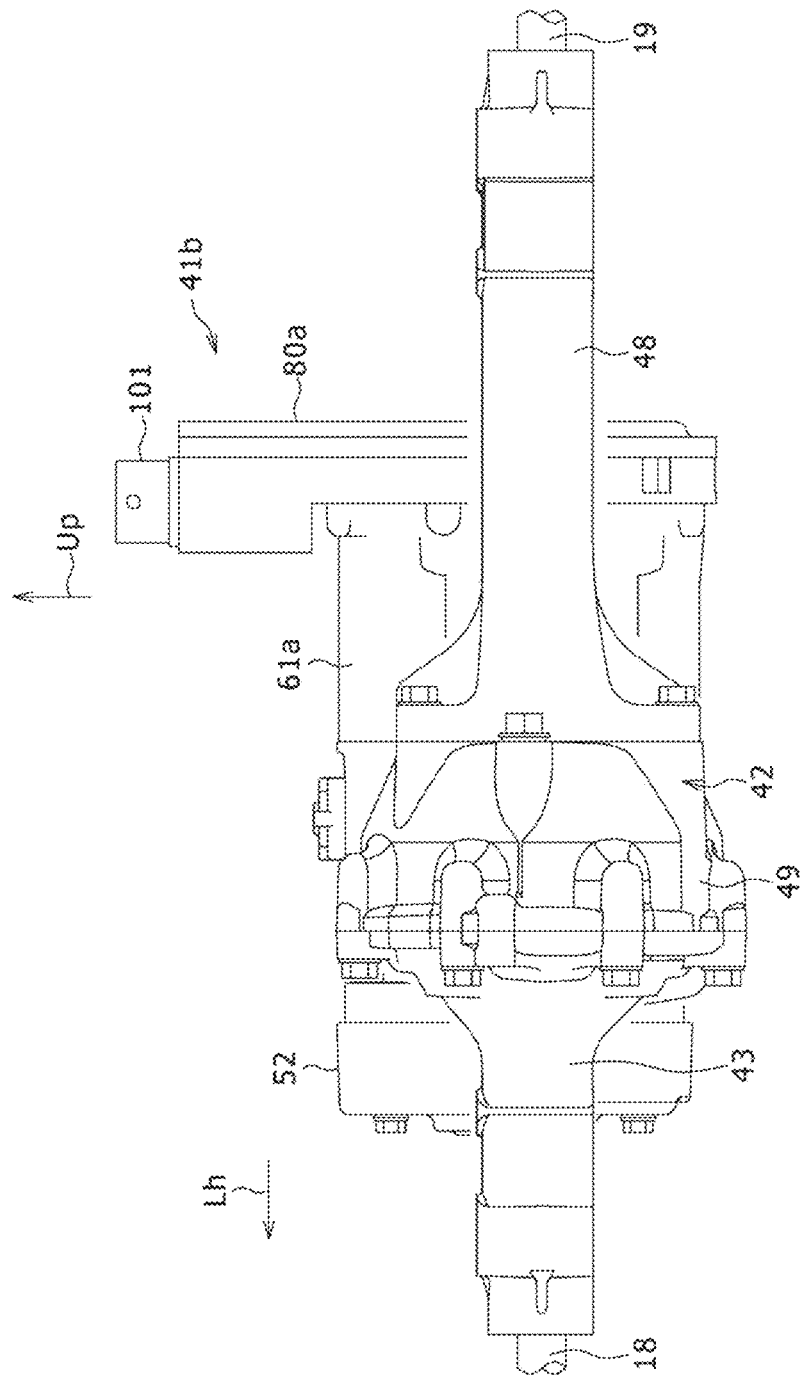
FIG. 15 is a rear view of the axle driving apparatus with an electric motor for a work vehicle of FIG. 13.
Figure 16:
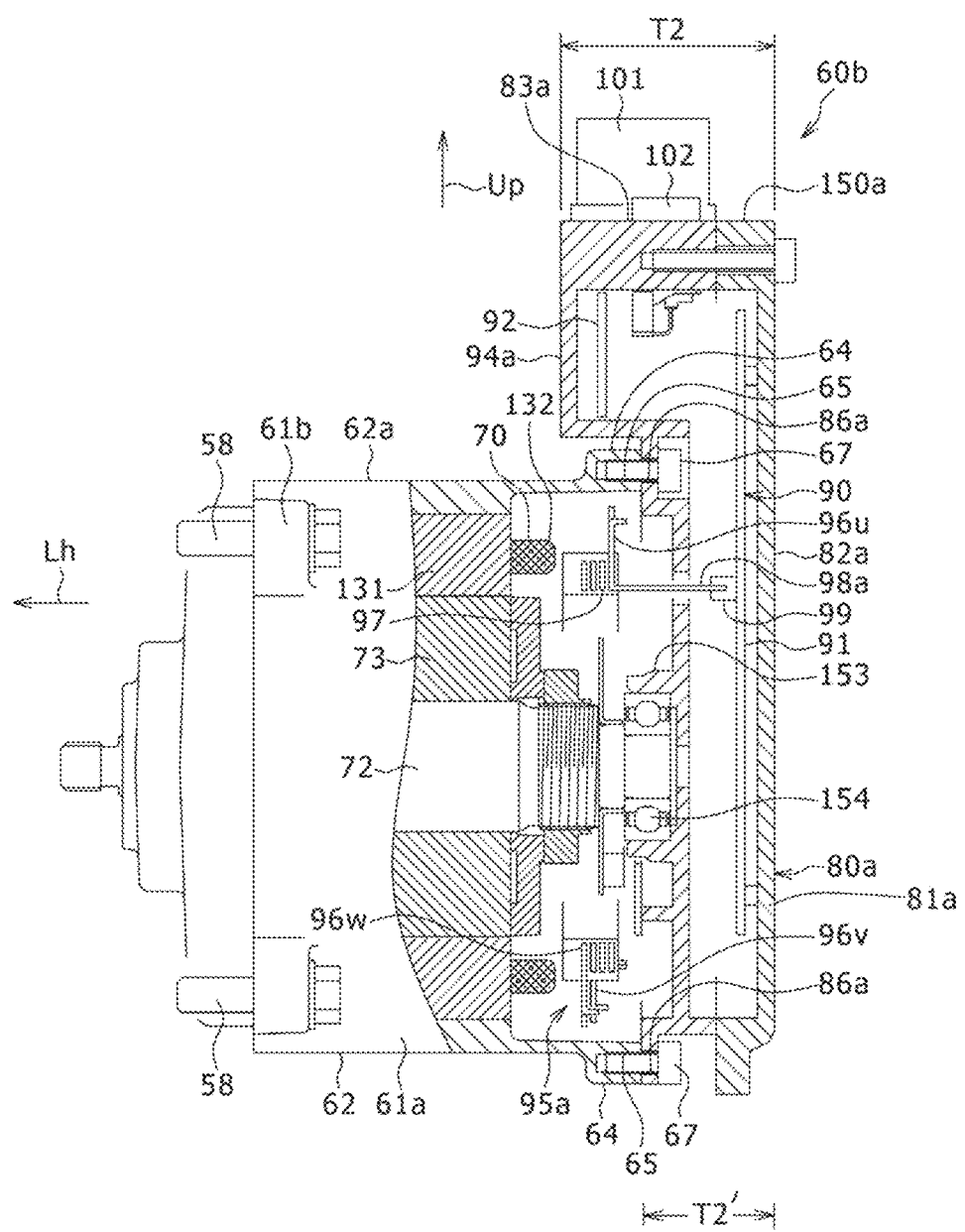
FIG. 16 is a view, partially shown as cross sectional view, of the motor inverter device shown in FIG. 13 viewed from an arrow C's direction.
Figure 17:
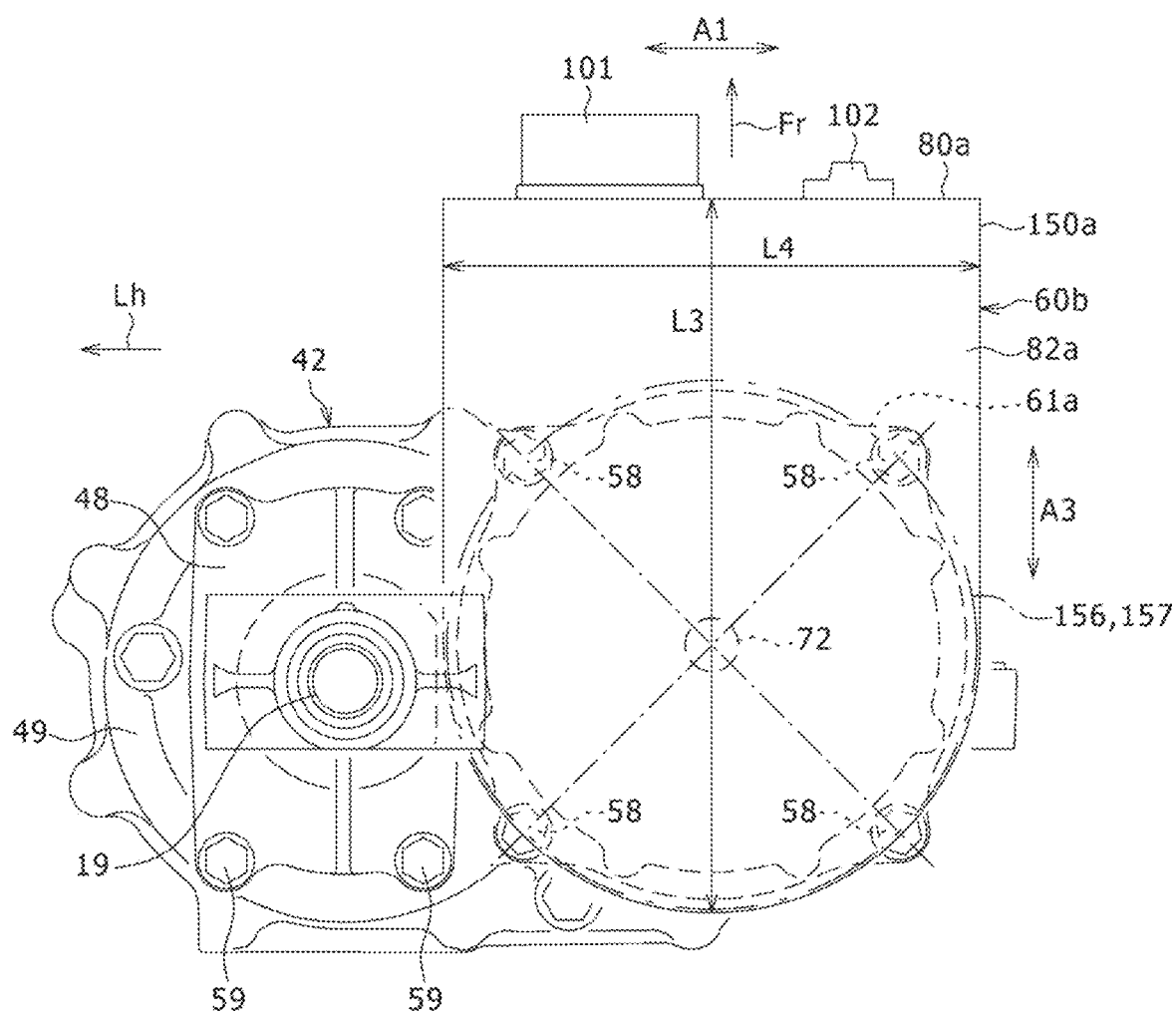
FIG. 17 is a view of FIG. 13 viewed from an arrow D's direction.

FIG. 12 to FIG. 17 show a third embodiment which is further alternative example of the embodiment. FIG. 12 is a side view, partially shown as cross sectional view, of a vehicle mounting the axle driving apparatus 41*b* according to the third embodiment. FIG. 13 is a perspective view illustrating the axle driving apparatus 41*b* shown in FIG. 12. FIG. 14 is a plan view of the axle driving apparatus 41*b*. FIG. 15 is a rear view of the axle driving apparatus 41*b*. FIG. 16 is a view, partially shown as cross sectional view, of the motor inverter device 60*b* shown in FIG. 13 viewed from an arrow C's direction. FIG. 17 is a view of FIG. 13 viewed from an arrow D's direction.

In the axle driving apparatus 41*b* of the present example, the inverter case 80 (see FIG. 2) is not fixed to the outer circumferential surface of the motor case 61*a*. In addition, the motor cover is not fixed to the cylindrical main body 62*a* of the motor case 61*a*. Instead, the inverter case 80*a* is fixed to the end surface on the right side which is the other end side of the main body 62*a*.

As shown in FIG. 16, the inverter case 80*a* includes a base end 81*a* attached to the outer circumferential surface of the motor case 61*a*, and a terminal end 150*a* which is on the opposite side with respect to the base end 81*a*. The thickness T2 on the terminal end 150*a*'s side is set to be greater than the thickness T2' on the base end 81*a*'s side.

Furthermore, the thickness T2 (see FIG. 16) is smaller than the length L3 (see FIG. 17) in the first direction (i.e., an up-down direction indicated by a double-headed arrow A3 shown in FIG. 17) which is perpendicular to the thickness direction, so that it has a flat shape. The inverter case has the lengths L3 and L4, which are greater than the thickness T2, in a first direction and in a second direction (the left-right direction indicated by the double-headed arrow A4 shown in FIG. 17) which are orthogonal to the thickness direction. In the inverter case 80*a*, the length L3 in the first direction is greater than the length L4 in the second direction. Therefore, the inverter case 80*a* has a flat shape elongated in the first direction perpendicular to the thickness direction. Here, the "thickness" refers to a dimension in a direction perpendicular to a plate-surface first direction (longitudinal direction) and a plate-surface second direction (traverse direction) in the first and second circuit boards 91, 92.

The inverter case 80*a* includes a first plate portion 82*a* provided at a right side end, a peripheral wall portion 83*a* extending outward in a vehicle width direction from an outer circumferential edge of the first plate portion 82*a*, and a second plate portion 84*a* closing an opening at an upper end of the peripheral wall portion 83*a*, and is a substantially L-shaped box as viewed from a side, as shown in FIG. 15. As shown in FIG. 17, as viewed from the right side, the first plate portion 82*a* has an outer shape in which the lower end which is one side end in the longitudinal direction which is the first direction of the rectangle has an arc-shaped cross section corresponding to a cross-sectional shape of the motor case 61*a*. As shown in FIG. 16, the inverter case 80*a* is formed, for example, by screwing two case elements separated in the right-left direction with bolts.

Furthermore, a cylindrical portion 153 protrudes into an inner space surrounded by the bolt insertion holes 86*a* of the second plate portion 84*a* of the inverter case 80*a*. A bearing 154 which rotatably supports one side end of the motor shaft 72 is fixed to the inside of the cylindrical portion 153.

When the inverter case 80*a* is mounted on the end surface of the motor case 61*a*, the terminal end 150*a* thereof is not faced toward the second axle case 48 (i.e., the first and second axles 18, 19 directions), as viewed from the axial direction of the electric motor 70. The terminal end 150*a* is protruded radially outwardly from the outer circumferential surface of the motor case 61*a*. This allows the inverter case 80*a* to be thin while keeping the areas necessary for the circuit boards of the inverter circuit, so that the inverter case 80*a* can be prevented from interfering with other components mounted on the vehicle side in the thickness direction of the inverter case 80*a* installed in the vehicle. Furthermore, the terminal end 150*a* of the inverter case 80*a* is disposed above the motor case 61*a*.

Moreover, the terminal end 150*a* of the inverter case 80*a* is greater in thickness in a direction approaching the axle case 42 along the axial direction of the electric motor 70 than the base end 81*a* of the inverter case 80*a*. This allows the overall thickness of the inverter case 80*a*, i.e., the axial dimension of the axle case to be prevented from becoming excessively large, so that interference between the inverter case 80*a* and other components can be more effectively prevented by the structure in which the inverter case 80*a* is fixed to the end surface of the motor case 61*a*.

Furthermore, as shown in FIG. 16, the circuit boards of the inverter 90 are formed in a configuration such as two stages of the first circuit board 91 and the second circuit board 92 in an inner space of the terminal end 150*a* of the inverter case 80*a*, whereby the base end 81*a* of the inverter case 80*a* can be made thinner and the terminal end 150*a* can protrude toward the axle case 42. This allows the outer surface of inverter case 80*a* to be prevented from largely protruding in the axial direction with respect to motor case 61*a*, and allows the whole length of the entire axle driving apparatus 41*b* in the axial direction to be suppressed from increasing.

Figure 18:
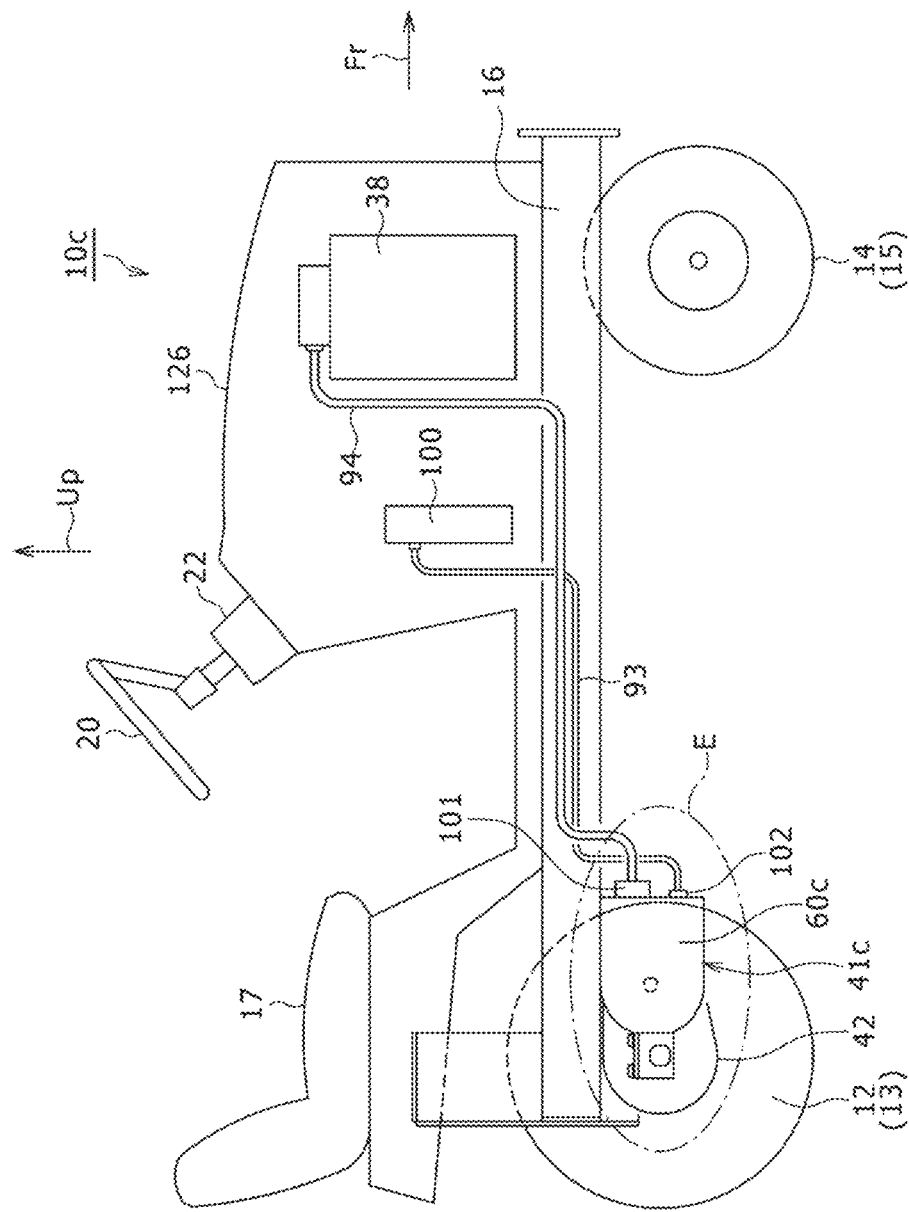
FIG. 18 is a side view, partially shown as cross sectional view, of a vehicle mounting an axle driving apparatus with an electric motor for a work vehicle according to still further alternative example of the embodiment.
Figure 19:
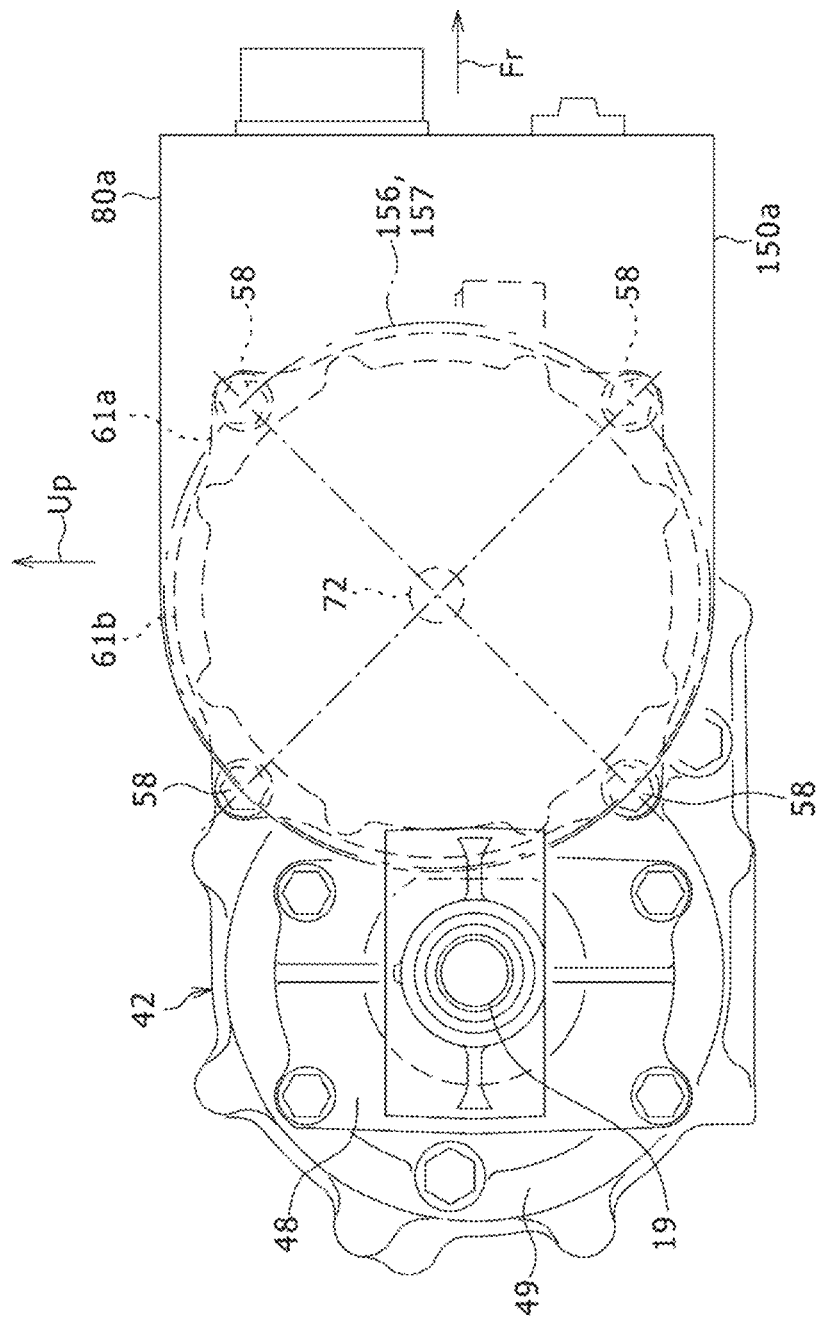
FIG. 19 is an enlarged view of a region E in FIG. 18.

As shown in FIG. 14 and FIG. 16, bolts 58 are inserted into and supported by attaching bosses 61*b* in order to attach the intermediate case 49 to the motor case 61*a*. As shown in FIG. 17, the attaching bosses 61*b* and the bolts 58 are positioned on the first and second virtual circles whose center point P is a center of the motor shaft 72 and are arranged at equal intervals of 90 degree. The screw holes (not shown) are formed in the intermediate case 49 at positions corresponding to the bolts 58 for attaching the intermediate case 49 to the motor case 61a in a peripheral edge portion of the opening 49a (see FIG. 4). In the present example, as shown in FIG. 18 and FIG. 19 referred later, this configuration allows the terminal end 150a of the inverter case 80a to be attached to the axle case 42 so that a posture thereof is selectively changeable between a plurality of attachment postures which differ in orientation by 90 degree about the center point P which is the center of rotation of the motor shaft 72.

As shown in FIG. 16, the bus bar unit 95a including four bus bars which are disc-shaped conductive members is disposed at an end on the inverter case 80a side in the inner space of the motor case 61a. One end of each of lead plates 98, which protrudes toward the inverter 90 along the vehicle-width direction parallel to the motor shaft 72, is connected to different positions in a direction along the circumference of each of the three-phase bus bars 96u, 96v, and 96w of the bus bar unit 95a. Each of the lead plates 98a passes through the second plate portion 84a of the inverter case 80a and is connected to the connection terminal 99 of the corresponding phase, which protrudes from the first circuit board 91 of the inverter 90 toward the electric motor 70.

A first connector 101 and a second connector 102 are attached to an upper end surface of the terminal end 150a of the inverter case 80a so as to protrude outward. The power cable 94 connected to the power unit 38 is connected to the first connector 101. The signal cable 93 connected to the controller 100 is connected to the second connector 102.

In the present example, the terminal end 150a of the inverter case 80a extends in the up-down direction with the connectors 101, 102 being oriented upward. This makes it easy to keep a necessary vertical gap between the axle driving apparatus 41b and the ground.

In the foregoing, the example, in which the inverter case 80a is fixed to the motor case 61a by the screw connection using the four bolt insertion holes 86a of the inverter case 80a, the four bolts 67, and the four screw holes 65 of the motor case 61a, is described. However, the present disclosure is not limited to this configuration, and as long as screw insertion hoses such as the bolt insertion holes are positioned on the first virtual circle and the screw holes are positioned on the second virtual circle, the number of the screw insertion holes, the screw holes, and the bolts may be any integer of two or more. In the present example, the other configurations and functions are similar to those shown in FIG. 1 to 9.

Fourth Embodiment

FIG. 18 and FIG. 19 show a fourth embodiment which is still further alternative example of the embodiment. FIG. 18 is a side view, partially shown as cross sectional view, of a work vehicle 10c mounting the axle driving apparatus 41c according to still further alternative example of the first embodiment. FIG. 19 is an enlarged view of a region E in FIG. 18.

In the configuration of the present example, the inverter case 80a is fixed to the motor case 61a such that the orientation of the inverter case 80a is different by 90 degree from the configuration of the example shown in FIG. 12 to FIG. 17. Specifically, the inverter case 80a is fixed to the motor case 61a so as to extend forward with respect to the motor case 61a from the base end 81 fixed to the motor case 61a. This allows the thickened terminal end 150a of the inverter case 80a to be disposed forwardly from the motor case 61a.

In the present example, similarly to the configuration shown in FIG. 12 to FIG. 17, the intermediate case 49 has screw holes formed at four positions at equal intervals on the first virtual circle 156 on the right end surface of the intermediate case 49, and the motor case 61a has bolt insertion holes formed at four positions at equal intervals on the second virtual circle 157 which is the same as the first virtual circle 156 in size. Compared to the configuration shown in FIG. 12 to FIG. 17, the motor case 61a can be fixed to the axle case 42 without changing the basic shape of the outside appearance of the inverter case 80, by changing the orientation of the inverter case 80a by 90 degree about the center point P of the first and second virtual circles 156 and 157, i.e., about the center axis of the motor shaft 72.

In the first embodiment or the second embodiment, the inverter case 80 may be screwed to the motor case 61 such that the orientation of the inverter case 80 can be changed to be different from the front-rear direction by 90 degree, for example, by forming the screw holes at equal intervals on the first virtual circle of the motor case 61 and forming the bolt insertion holes at equal intervals on the second virtual circle of the inverter case 80.

In such a configuration, the electric motor and the inverter needs to be electrically connected as follows. That is, referring to FIG. 16 described above, one end of each of lead plates 98a, which protrudes toward the inverter 90 along the vehicle-width direction parallel to the motor shaft 72, is connected to different positions in a direction along the circumference of each of the three-phase bus bars 96u, 96v, and 96w of the bus bar unit 95a. Each of the lead plates 98a passes through the second plate portion 84a of the inverter case 80a and is connected to the connection terminal of the corresponding phase, which protrudes to the electric motor side of the first circuit board 91 of the inverter 90. At this time, the other end of each of the lead plates 98a is connected to the connection terminal through the opening formed in the second plate portion 84a of the inverter case 80a. In the present example, the opening may be formed at a position different from that of the example shown in FIG. 16 accompanying the configuration that the orientation of the inverter case 80a is different from that of the example shown in FIG. 16 by 90 degree. On the other hand, the opening of the inverter case 80a, through which the lead plates 98a derived from the motor case 61a pass, and the connection terminal 99, to which the other end of each of the lead plates 98a is connected, may be provided only one each or a three-phase one set each at corresponding positions before and after the orientation of the inverter case 80a is changed so that the orientation of the inverter case 80a can be changed by 90 degree. In the present example, the other configurations and functions are similar to those shown in FIG. 12 to 17.

REFERENCE SIGNS LIST 10, 10a, 10b, 10c Work vehicle
12, 14 Left wheel
13, 15 Right wheel
16 Main frame
17 Operator's seat
18 First axle
19 Second axle
25 Mower device
26 Mower deck
27 Mowing blade
28 Electric motor
36 Operation lever 38 Power unit
41, 41a, 41b, 41c Axle driving apparatus with an electric motor
42 Axle case
43 First axle case
45 Input shaft support
46 Axle support
48 Second axle case
49 Intermediate case
60, 60a, 60b, 60c Motor inverter device
61, 61a Motor case
63 Motor cover
68 Motor cover
69 Inverter fixing portion
70 Electric motor
72 Motor shaft
73 Motor rotor
77 Gear mechanism
78 Reduction gear mechanism
80, 80a Inverter case
81, 82a Base end
82, 82a First plate portion
83, 83a Peripheral wall portion
84, 84a Second plate portion
85a First portion
85b Second portion
86, 86a Bolt insertion hole
87 First virtual circle
88 Screw hole
89 Second virtual circle
90 Inverter
91 First circuit board
92 Second circuit board
93 Signal cable
94 Power cable
95, 95a Bus bar unit
96u, 96v, 96w Bus bar
97 Neutral point bus bar
98, 98a Lead plate
99 Connection terminal
100 Controller
101 First connector
102 Second connector
118 Differential gear
119 Ring gear
131 Stator core
132 Stator coil
150, 150a Terminal end
156 First virtual circle
157 Second virtual circle

The invention claimed is:

1. An axle driving apparatus with an electric motor mounted on a work vehicle that travels by driving right and left wheels with the electric motor, comprising:
an axle case for accommodating an input shaft to receive power from the electric motor, first and second axles substantially parallel to the input shaft, a differential gear to differentially connect the first and second axles, and a gear mechanism to operationally connect the input shaft and the differential gear, the axle case including an input shaft support for supporting the input shaft and an axle support for supporting the first and second axles;
a motor case of the electric motor that is provided on one side of the input shaft support; and
an inverter for controlling the electric motor to be able to supply power, the inverter including an inverter case to accommodate a circuit board of the inverter,
wherein the inverter case has a base end attached on an end surface of the motor case and a terminal end that is formed on an opposite side with respect to the base end, and the terminal end protrudes radially outwardly from an outer circumferential surface of the motor case in a direction not facing the first and second axles;
wherein
the motor case has a plurality of screw holes formed at a plurality of positions on a first virtual circle in the end surface,
the inverter case has a plurality of screw insertion holes formed at a plurality of positions on a second virtual circle that is the same as the first virtual circle in size, the inverter case is fixed to the motor case by screw connection using the plurality of screw insertion holes and the plurality of screw holes, and the inverter case is configured attachable to the motor case so as to be able to select one of a plurality of attachment postures around a center point of the first and second virtual circles.

2. The axle driving apparatus with the electric motor according to claim 1, wherein
the plurality of screw holes are formed at equal intervals on the first virtual circle in the end surface of the motor case, and
the plurality of screw insertion holes are formed at equal intervals on the second virtual circle of the inverter case.

3. The axle driving apparatus with the electric motor according to claim 2, wherein
the inverter case is attached to the motor case so that a posture of the inverter case is changeable between the plurality of attachment postures which differ in orientation by 90 degree.

* * * * *